United States Patent [19]
Iwasa

[11] Patent Number: 5,977,938
[45] Date of Patent: *Nov. 2, 1999

[54] APPARATUS AND METHOD FOR INPUTTING AND OUTPUTTING BY USING AERIAL IMAGE

[75] Inventor: Seiichi Iwasa, Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/735,752

[22] Filed: Oct. 23, 1996

[30] Foreign Application Priority Data

May 21, 1996 [JP] Japan .................................. 8-125461

[51] Int. Cl.$^6$ ..................................... G09G 3/00
[52] U.S. Cl. ............................... 345/32; 345/48
[58] Field of Search .................... 345/173, 175, 345/176, 180, 183, 156, 157, 32, 30, 81, 82, 84, 207, 48

[56] References Cited

U.S. PATENT DOCUMENTS

| | | |
|---|---|---|
| 3,647,284 | 3/1972 | Elings et al. . |
| 4,484,179 | 11/1984 | Kasday ..................................... 345/176 |
| 4,868,551 | 9/1989 | Arditty et al. ........................... 345/176 |
| 5,231,388 | 7/1993 | Stoltz ......................................... 345/84 |
| 5,479,187 | 12/1995 | Chen ......................................... 345/32 |

FOREIGN PATENT DOCUMENTS 6-348404 12/1994 Japan .

*Primary Examiner*—Chanh Nguyen
*Attorney, Agent, or Firm*—Staas & Halsey

[57] ABSTRACT

A visible light corresponding to an input key is generated from a visible light generating unit as a display source, thereby allowing an aerial image as a mirage of an input operating unit to appear by an aerial image forming unit using a pair of parabola mirrors or the like. When touching the aerial image by a finger, its reflected light is detected by a photodetecting unit. A controller discriminates an operating position from a driving timing of the visible light generating unit and outputs a switch signal to the outside.

32 Claims, 32 Drawing Sheets

FIG. 3
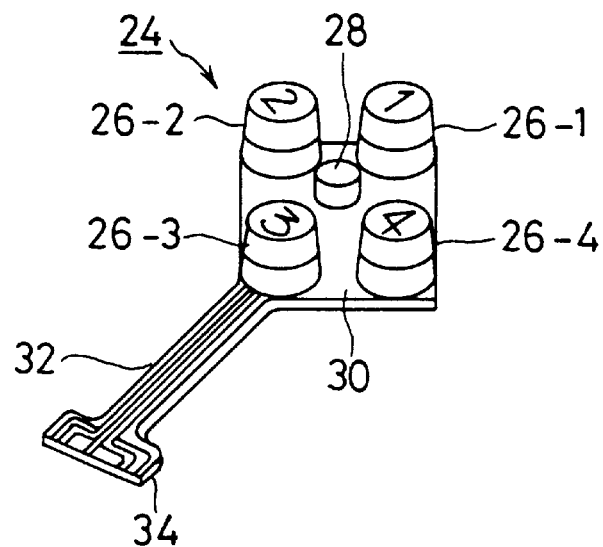
FIG. 4
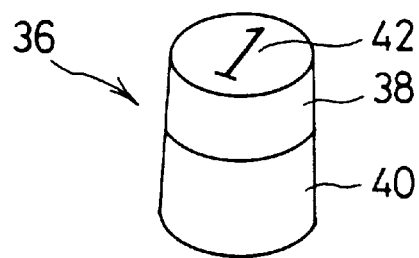
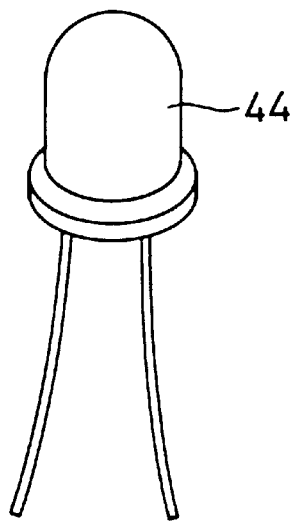

FIG. 8A CLOCK E1 

FIG. 8B 1/2 FREQUENCY DIVIDING SIGNAL E2 

FIG. 8C 1/4 FREQUENCY DIVIDING SIGNAL E3 

FIG. 8D TIMING SIGNAL E4 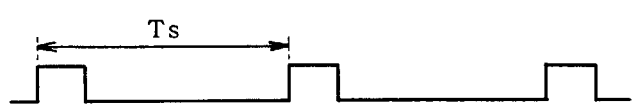

FIG. 8E TIMING SIGNAL E5 

FIG. 8F TIMING SIGNAL E6 

FIG. 8G TIMING SIGNAL E7 

FIG. 8H PHOTO DETECTION SIGNAL E8 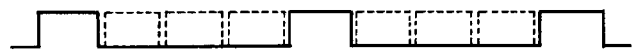

FIG. 8I DISCRIMINATION SIGNAL E9 

FIG. 8J DISCRIMINATION SIGNAL E10 

FIG. 8K DISCRIMINATION SIGNAL E11 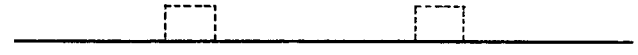

FIG. 8L DISCRIMINATION SIGNAL E12 

FIG. 8M SWITCH SIGNAL S1 

FIG. 8N HOLDING CLEAR SIGNAL 

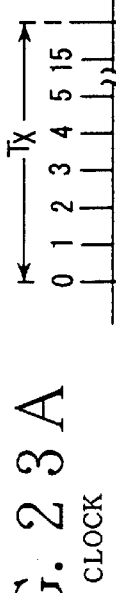
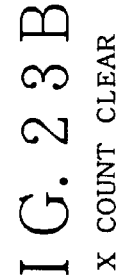
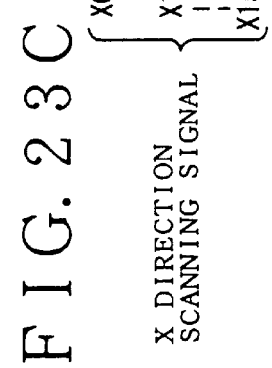
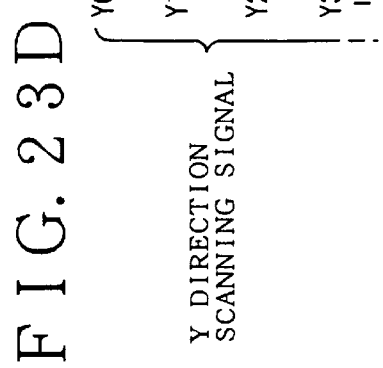
FIG. 23A CLOCK
FIG. 23B X COUNT CLEAR
FIG. 23C X DIRECTION SCANNING SIGNAL
FIG. 23D Y DIRECTION SCANNING SIGNAL

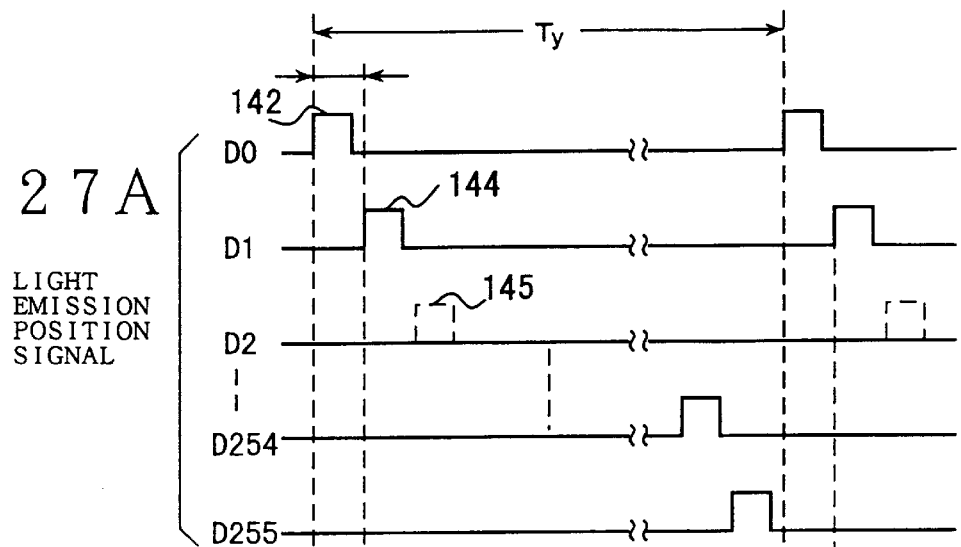
FIG. 27A LIGHT EMISSION POSITION SIGNAL
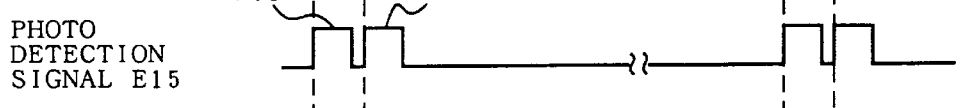
FIG. 27B PHOTO DETECTION SIGNAL E15
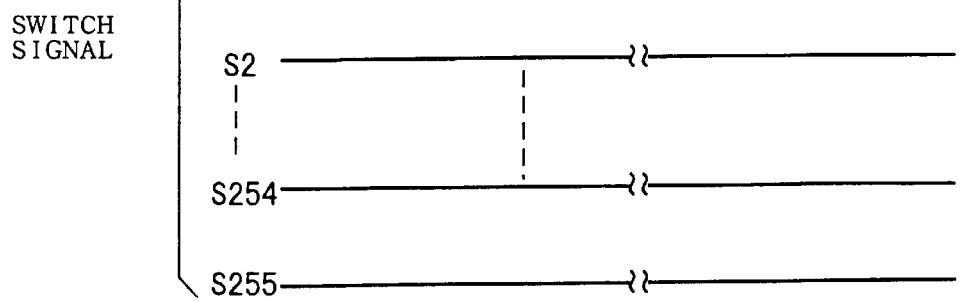
FIG. 27C SWITCH SIGNAL

FIG. 31A MIRROR SURFACE SYNC SIGNAL E16

FIG. 31B SYNC SIGNAL E17

FIG. 31C SYNC SIGNAL E18

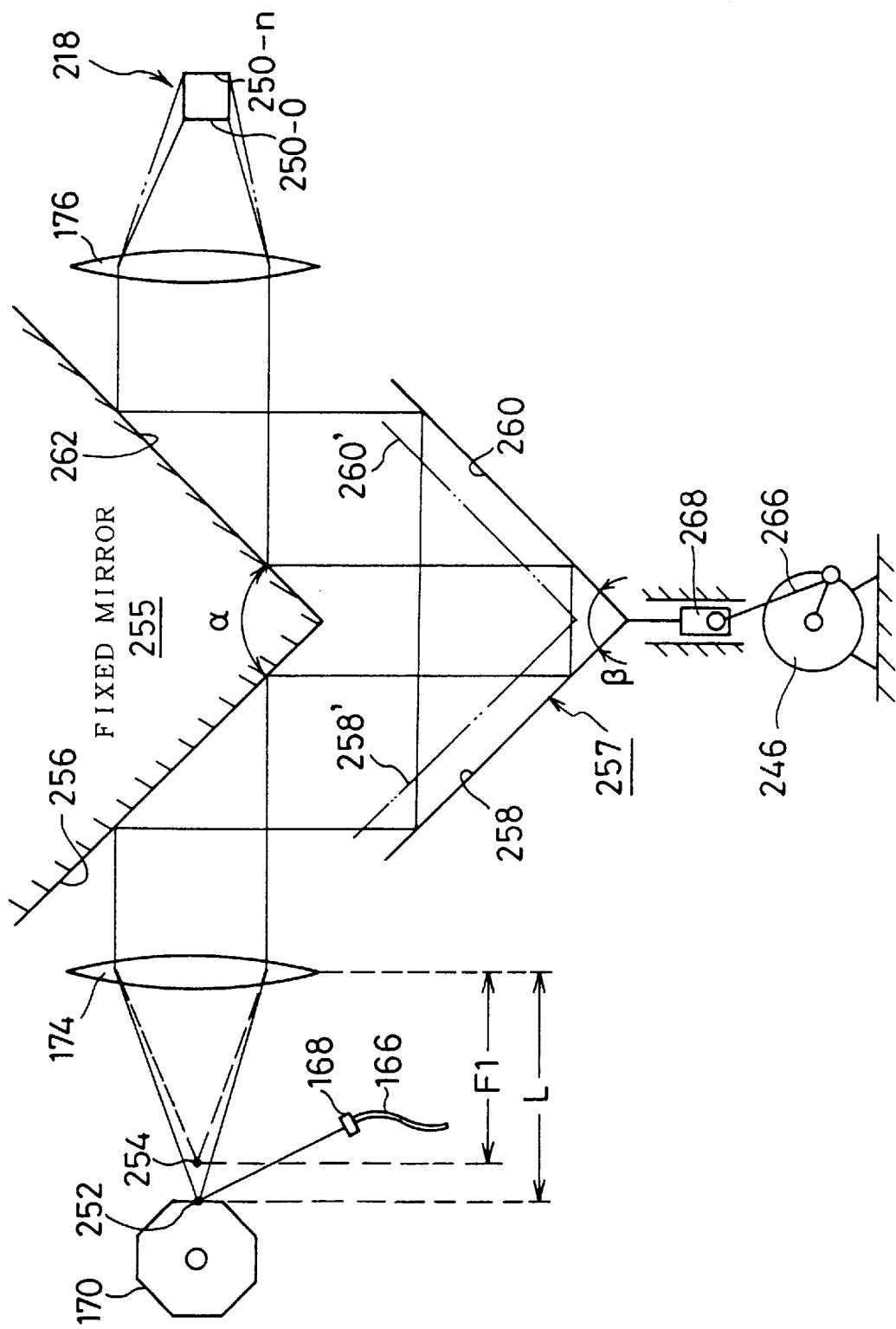

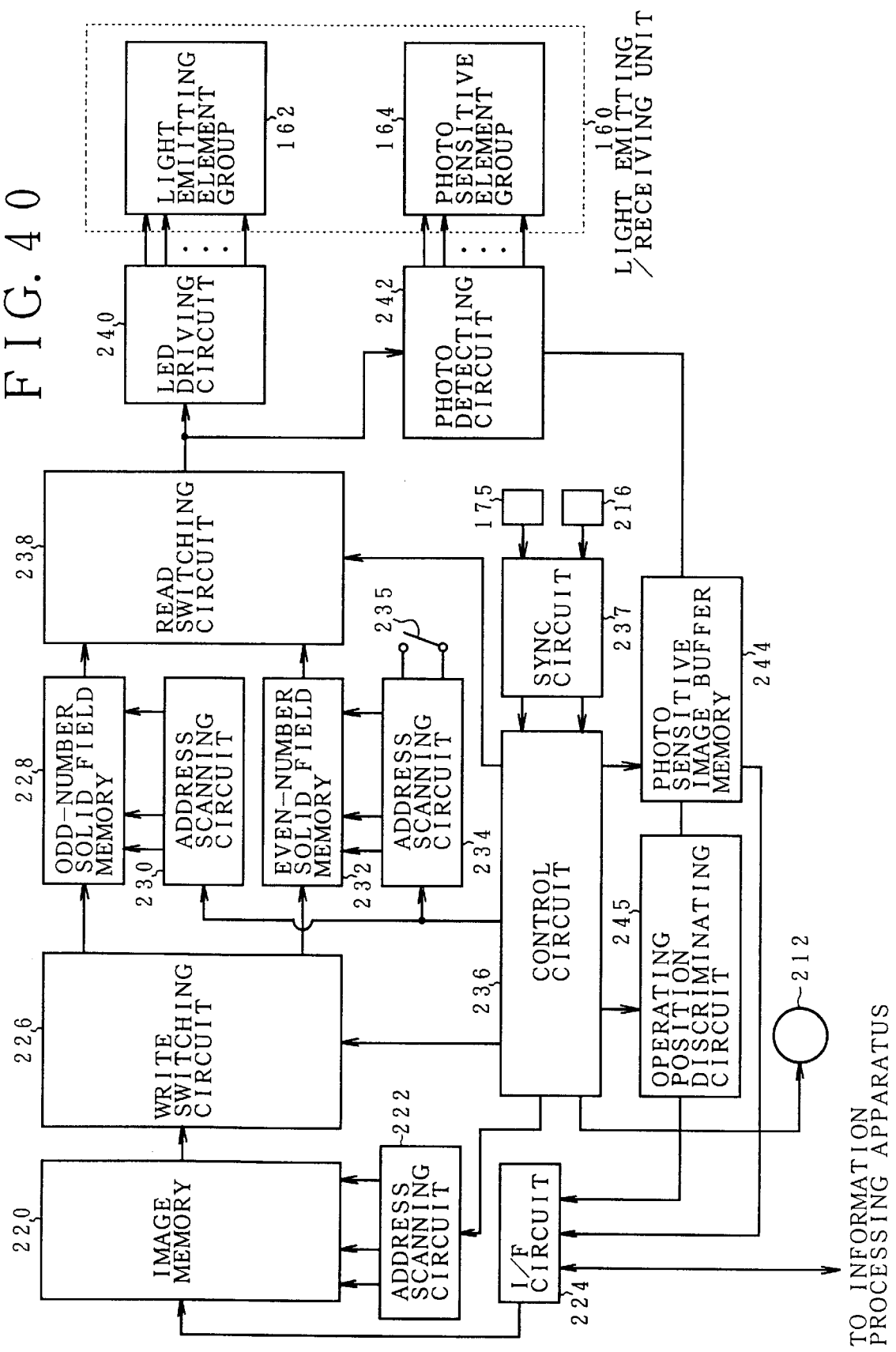

APPARATUS AND METHOD FOR INPUTTING AND OUTPUTTING BY USING AERIAL IMAGE

BACKGROUND OF THE INVENTION

The present invention relates to aerial image input/output apparatus and method for allowing an image of keys, a touch panel, or the like which is used for input/output operations of an information processing apparatus such as a computer or the like to appear as an aerial image in a blank space, and for inputting an instruction by operating the aerial image by a finger tip or the like. More particularly, the present invention relates to aerial image input/output apparatus and method for allowing an aerial image which is used for an inputting operation to appear in a space by using a key switch, a two-dimensional display, a line display, or the like which actually exists and for operating the aerial image.

In recent years, the multimedia in which information such as voice, image, and the like can be freely received and transmitted through a network has gloriously been advertised. Although the present time is called a multimedia age, it is an actual situation that in a conventional input/output device is used as a man-machine interface. In the conventional input/output device which is used as a man-machine interface, a CRT display, a liquid crystal display, or a plasma display is used to output and display. The displays are widely employed in the fields where their characteristics can be effectively used, respectively. For example, the liquid crystal display is used in small portable equipment, the plasma display is used in large equipment, and the CRT display is used in desktop information equipment, television, and the like. On the other hand, a keyboard, a mouse, a touch panel, and the like are used as input devices. Those devices are also widely employed in the fields where their characteristics can be effectively used. Further, as a device integrated with input/output functions, a touch panel switch device in which a touch panel is arranged on the surface of the CRT display is also widely used.

A general touch panel has a structure such that a plurality of transparent electrodes made of tin oxide or the like are arranged in both of the X direction (row direction) and the Y direction (column direction) and a position which is touched by a finger is specified by detecting an X coordinate and a Y coordinate of the position touched by the finger.

As a method of detecting the touch of the finger, there are the following methods: a method of detecting a change in electrostatic capacitance between the X and Y electrodes; a method of detecting a current change due to a short-circuit between the X and Y electrodes; a method of detecting human noises inducted in the X and Y electrodes; and the like. The touch panel is arranged on the surface of a display device such as a CRT display or the like and has a function to transmit an intention of a human to the information processing apparatus by touching a specific display position by a finger or the like. However, there is a limitation in a resolution of the present touch panel.

A display screen can be divided into tens or at most hundreds of portions, so that image information which requires a high resolution cannot be inputted. Since the touch panel switch device has a structure in which a touch panel and a display device which are separately manufactured are integratedly combined, a display surface and a touch surface are apart from each other by an amount corresponding to only by a thickness of glass or the like which protects the surface of the display, that is, by about a few mm. Consequently, a phenomenon in which the position of an image is deviated from the position to be touched by the finger occurs depending on an angle at which the image is seen. Such a phenomenon is also a factor to limit the resolution of the touch panel. Further, since two independent hardware devices having respective structures such as display device and input device are combined, the costs are inevitably high.

For such a conventional input/output device, there has been proposed a unique input method whereby when an image that is used for an inputting operation is allowed to appear as an aerial image in a space and the aerial image appearing in the space is touched by a finger, the position touched by the finger is detected, thereby inputting data (JP-A-6-348404). According to the input method, a display screen such as a CRT or the like is arranged on the lower surface of one end of a translucent plate and a real image of the display screen is projected at the corresponding symmetrical position on the upper surface of the translucent plate by two retroreflecting plates which are in contact with the other end of the translucent plate and each of which is arranged at an angle of almost 45° from the translucent plate, thereby allowing an aerial image to appear. The retroreflecting plate is a reflecting plate to reflect an incident light in the incoming direction irrespective of an angle of incidence. When an object such as a finger or the like is inserted into the space in which the aerial image appears by the projection of the display screen, the position is detected by an object position detecting unit. A switch signal for inputting an instruction is generated on the basis of the detected position of the object and position information of a figure in the projected display screen. In the conventional input method in which the aerial image is displayed and the inputting operation is executed, the half of the light emitted from the image displayed on the display screen is reflected by the translucent plate and is reflected by the retroreflecting plate on the lower side and again enters the translucent plate. The further half of the light transmitted through the translucent plate forms an image at the corresponding position that is symmetrical to that on the display screen on the upper side of the translucent plate. On the other hand, as for the light emitted from the image of the display screen and transmitted through the translucent plate for the first time, the half of the light is reflected by the retroreflecting plate on the upper side. The half of the light is further reflected by the translucent plate and forms an image at the same position as that of the light reflected for the first time by the translucent plate. That is, according to the input method, even if the reflectance of the retroreflecting plate is equal to 100%, only the half of the light emitted from the display screen can be used in principle. In JP-A-6-348404, further, Scotchlites 7610 and 7615 manufactured by 3M Co., Ltd. are disclosed as retroreflecting plates. Although each of the retroreflecting plates is regarded as a most efficient retroreflecting plate which is presently available, it has been developed for a traffic-control sign or a signboard to reflect a headlight of a car. Therefore, the retroreflecting plate is not an optical member having an optically high precision, it is difficult to form a clear optical image in a space, and the reflectance is less than 50%. The aerial image obtained by the conventional input method is, consequently, very blurred and its brightness is also equal to or less than ¼ of that of the display screen. The aerial image cannot help but is dark and indistinct. Thus, information which is outputted from an information processing apparatus or the like cannot be displayed at a resolution and a brightness which are similar to those of the CRT display, liquid crystal display, or the like. An apparatus for detecting the position of the finger or the like for the aerial image and inputting an instruction is separately formed and is used in combination with the display device of the aerial image. Such a construction is basically the same as the conventional touch panel and similar problems occur. A mirror arrangement for creating a real image in space of the object being displayed is disclosed in U.S. Pat. No. 3,647,284.

SUMMARY OF THE INVENTION

According to the invention, in order to realize a human-oriented real multimedia, novel aerial image input/output apparatus and method of information, in which inputting and outputting functions are integrated and an aerial image is allowed to clearly appear in a space are provided.

An aerial image input/output apparatus of the invention comprises: a visible light generating unit for generating visible lights corresponding to one or a plurality of input operating units; and an aerial image forming unit for forming an optical real image of the input operating units, that is, an aerial image as what is called a mirage into a space on the basis of the visible lights generated from the visible light generating unit. The apparatus also has a photodetecting unit for detecting an operation for touching the aerial image by a finger from a reflected light. A controller selectively emits the visible light corresponding to the input operating unit by driving the visible light generating unit, thereby forming an aerial image, and outputs a position detection signal to the outside when the operation of the aerial image by the finger or the like is detected. For example, the controller has: light emitting keys as a visible light generating unit for generating the visible lights corresponding to one or a plurality of input operating units; and, for example, a parabola mirror unit as an aerial image forming unit for forming the aerial image as a mirage of the input operating units into a space on the basis of the visible lights generated from the light emitting keys. A photosensitive element as a photodetecting unit for detecting the operation to touch the aerial image by the finger from the reflected light is also provided. The controller selectively emits the visible light corresponding to the input operating unit by driving the light emitting key, thereby forming the aerial image. When the operation of the aerial image by the finger or the like is detected, the position detection signal is outputted as a switch signal to the outside. A pair of parabola mirrors are used as a parabola mirror unit functioning as an aerial image forming unit. The aerial image of the input operating unit is formed in the space of an opening by the mirror surfaces of the two parabola mirrors which face each other. A rotational ellipsoidal mirror which is opened by cutting out a part can be also used as an aerial image forming unit. The visible light generating unit is arranged at a focal position of one of the rotational ellipsoidal mirrors and the aerial image of the input operating unit is formed in the opening. The rotational ellipsoidal mirror can have either a mirror surface obtained by rotating an ellipsoid around the major axis and notching the surface in the minor axial direction or a mirror surface obtained by rotating an ellipsoid around the major axis and notching the surface in the major axial direction. The opening of the rotational ellipsoidal mirror is covered by a transparent cover so that dusts or the like do not enter the inside. The opening of the rotational ellipsoidal mirror is covered by a transparent cover and a part of the transparent cover is made opaque so that the internal visible light generating unit cannot be directly seen from the opening, thereby enabling a visible range to be widened. As another aerial image forming unit, the visible light generating unit is arranged at or near the focal position of the parabola mirror and a convex lens is arranged with a predetermined distance away from the parabola mirror, thereby forming an aerial image of the input operating unit into a space of the focal position of the convex lens. In this case, by arranging a plane mirror between the parabola mirror and the convex lens, the optical axial direction can be deflected to an arbitrary direction. As another aerial image forming unit, a second convex lens is arranged with a predetermined distance away from a first convex lens in which the visible light generating unit is arranged at or near the focal position and the visible light is converted into a parallel light beam by the second convex lens for forming the aerial image of the input operating unit into the space at the focal position of the second convex lens, so that the distance between the first and second convex lenses can be arbitrarily determined as necessary. When one or a plurality of light emitting keys having a light emitting element are used as a visible light generating unit serving as a display source of the aerial image, it is sufficient to simply construct the photodetecting unit merely by providing the light emitting keys and the photosensitive element. An operating position of the aerial image can be detected by receiving the reflected light according to the operation of the aerial image by the photosensitive element. A key top made of a transparent material having a display of a numeral, a symbol, or the like in a vertex portion is attached to the light emitting key serving as a display source of the aerial image. Thus, the aerial image of the light emitting key having the character or numeral appears and can be operated as an input key of the aerial image which can be visually clearly recognized although it doesn't physically exist. The controller which is used for the inputting and outputting operations using the aerial image has: a drive scanning circuit for sequentially scanning a plurality of light emitting elements of the visible light generating unit in accordance with a predetermined timing; and a discriminating circuit for discriminating the position of the light emitting element corresponding to the operation of the aerial image on the basis of scanning timings of the plurality of light emitting elements by the drive scanning circuit and a photodetection signal by the photosensitive element of the photodetecting unit and for outputting a position detection signal.

A two-dimensional image generator in which a plurality of light emitting elements are arranged in the vertical and horizontal directions can be also used as a visible light generating unit serving as a display source of the aerial image. One or a plurality of photosensitive elements which construct the photodetecting unit are arranged near the light emitting surface of the 2-dimensional image generator and receive the reflected light by the operation of the 2-dimensional image in a space. The controller allows the aerial image forming unit to form a plane aerial image by scanning the light emitting elements of the 2-dimensional image generator according to the image input of a character, a figure, or the like. Further in detail, the controller has: an image storing circuit in which image information generated by the 2-dimensional image generator has been stored; a drive scanning circuit for sequentially scanning a plurality of light emitting elements of the 2-dimensional image generator in accordance with a predetermined timing; and a discriminating circuit for discriminating the position of the light emitting element corresponding to the operation of the aerial image on the basis of the scanning timings of the plurality of light emitting elements by the drive scanning circuit and the photodetection signal by the photodetecting unit and for outputting a position detection signal. Either a fixed 2-dimensional matrix circuit in which image information has fixedly been stored by a wiring connection or an image memory into/from which image information can be freely written/read out can be used as an image storing circuit of the controller. A one-dimensional image generator in which a plurality of light emitting elements are arranged in a line is used as another visible light generating unit serving as a display source of the aerial image. In this case, the aerial image forming unit deflects the visible light from the 1-dimensional image generator by a deflecting unit such as a polygon rotational mirror (polygon mirror) or the like in the direction which perpendicularly crosses the line, scans it, and converts it into a 2-dimensional image. The 2-dimensional image is supplied to an aerial image optical system, thereby forming an aerial image. The 1-dimensional image generator has a 1-dimensional light receiving unit as a photodetecting unit, in which a plurality of photosensitive elements are arranged in the same line as the light emitting elements. The controller allows the plurality of light emitting elements in the 1-dimensional image generator to selectively emit the light in accordance with the image input of a character, a figure, or the like synchronously with the deflection scan of the deflecting unit, thereby allowing the aerial image forming unit to form a plane aerial image. Further in detail, the controller has: an image storing circuit in which image information generated by the 1-dimensional image generator has been stored; a drive scanning circuit for allowing the plurality of light emitting elements of the 1-dimensional image generator to selectively emit the light in accordance with the image information synchronously with the deflection scan of the deflecting unit; and a discriminating circuit for discriminating the image position corresponding to the operation of the aerial image on the basis of the driving timings of the plurality of light emitting elements by the drive scanning circuit and the photodetection signal by the photodetecting unit and for outputting a position detection signal.

The aerial image input/output apparatus of the invention simultaneously functions as an image reading apparatus. When it functions as an image reading apparatus, the photodetecting unit reads out a 2-dimensional image arranged at the forming position of the plane aerial image by detecting the reflected light. In this case, the controller forms a read scan light source for obtaining the read reflected light by allowing all of the light emitting elements of the 1-dimensional image generator to uniformly emit the light with a predetermined luminance.

The aerial image input/output apparatus of the invention allows a solid aerial image to clearly appear and can realize inputting and outputting functions. In order to allow the solid aerial image to appear, a 1-dimensional image generator as a light emitting element group 162 in which a plurality of light emitting elements are arranged in a line is used as a visible light generating unit serving as a display source of the aerial image. In the aerial image forming unit, the visible light from the 1-dimensional image generator is deflected and scanned in the direction which perpendicularly crosses the line by, for example, a polygon rotational mirror 170 serving as a deflecting unit. The light enters the aerial image optical system, thereby forming a plane aerial image. Further, the position in the optical axial direction of the plane aerial image formed by the aerial image optical system is reciprocally moved while moving step by step by a micro distance within a predetermined range, thereby forming a solid aerial image (phantom image) 218, by a solid aerial image forming unit. In this case, the controller comprises: an image storing circuit in which three-dimensional image information generated by the 1-dimensional image generator has been stored; a first drive scanning circuit for line-scanning the plurality of light emitting elements of the 1-dimensional image generator synchronously with the rotation of a polygon rotational mirror in accordance with 2-dimensional image information which was converted from 3-dimensional image information and was divided in the depth direction; a second drive scanning circuit for scanning in the depth direction the plane aerial image of a 2-dimensional image in the depth direction converted from a 3-dimensional image; and a discriminating circuit for discriminating the image position corresponding to the operation of the solid aerial image on the basis of driving timings of the plurality of light emitting elements by the first and second drive scanning circuits, the position in the depth direction, and the photodetection signal by the photodetecting unit and for outputting a position detection signal. In the aerial image forming unit for allowing the solid aerial image to appear, a second convex lens is fixedly arranged at a position apart by a predetermined distance from a first convex lens which receives a 2-dimensional scan image by the polygon rotational mirror and converts into a parallel light beam. A third convex lens for forming a plane aerial image at a focal distance by the synthesis with the second convex lens is provided in front of the second convex lens so as to be movable in the optical axial direction. The third convex lens is reciprocally moved while moving step by step by a micro distance within a predetermined range in the optical axial direction by an actuator. The focal distance on which the plane aerial image obtained by the synthesis with the second convex lens is formed is changed, thereby allowing a solid aerial image to appear. As another solid aerial image forming unit, the first convex lens is arranged while setting a position in front of a reflection point of the polygon rotational mirror to a focal position, a 2-dimensional scan image from the polygon rotational mirror is allowed to enter the first convex lens, and the image is converted into a non-parallel beam which is slightly converged in accordance with an optical path length. The second convex lens is fixedly arranged at a predetermined position for the first convex lens and a reflecting mirror is arranged between the first and second convex mirrors so as to be movable in such a direction as to change the optical path length. The actuator reciprocally moves the reflecting mirror while moving step by step by a micro distance within a range in which a predetermined optical path length is changed, thereby forming a solid aerial image. As a convex lens which is used for the aerial image input/output apparatus, it is desirable to use a Fresnel lens in which a refractive index of light differs in the radial direction from the center directing toward the outside. Further, a color of the aerial image according to the invention is a color itself of the display source as a visible light generating unit. By constructing display elements which are used in the visible light generating unit so as to display three primary colors of red (R), green (G), and blue (B), a color aerial image can be allowed to easily appear.

The invention also provides an input/output method using a clear aerial image having inputting/outputting functions. The input/output method comprises: a visible light generating step of generating a visible light corresponding to one or a plurality of input operating units; an aerial image forming step of forming an aerial image of the input operating unit into a space on the basis of the visible light which was selectively generated in the visible light generating step; and a photodetecting step of detecting the operation of the aerial image formed in the space in the aerial image forming step from the reflected light and outputting a position detection signal.

In the visible light generating step, a visible light of a 2-dimensional image of a character, a figure, or the like is emitted by sequentially scanning the plurality of light emitting elements which are two-dimensionally arranged. In the aerial image forming step, the visible light obtained by the sequential scan of the plurality of light emitting elements is allowed to enter, thereby forming the plane aerial image of the 2-dimensional image. In the visible light generating step, the plurality of light emitting elements which are one-dimensionally arranged are selectively driven so as to emit the light on the basis of the 2-dimensional image information. In the aerial image forming step, the visible light which was selectively emitted is allowed to enter, is deflected and scanned in the direction which perpendicularly crosses the line direction, is converted into the 2-dimensional image, and after that, the plane aerial image is formed. Further, in the visible light generating step, the plurality of light emitting elements which are one-dimensionally arranged are selectively driven so as to emit the light on the basis of the 2-dimensional images obtained by dividing a 3-dimensional image in the depth direction. In the aerial image forming step, the visible light which was selectively emitted is deflected and scanned in the direction which perpendicularly crosses the line direction and is converted to the 2-dimensional image. After that, the plane aerial image is formed. Simultaneously, the plane aerial image is reciprocally moved while moving the position thereof step by step by a micro distance within a predetermined range of the optical axial direction (depth direction), thereby forming a solid aerial image.

According to the input/output apparatus and method of the invention as mentioned above, the visible light is selectively generated by driving the light emitting keys, 2-dimensional display, 1-dimensional display, and the like, a character, an image, or the like is formed by scanning the visible lights, and the images from those display sources are used as optical real images and are allowed to directly appear as aerial images (mirage) in a space. Consequently, the conventional display device such as CRT display or liquid crystal display is unnecessary and the construction of the apparatus is extremely simple. Since the optically high-precision elements such as parabola mirror and lens are used in the optical system for allowing the aerial image to appear, the bright and clear aerial image can be obtained. It is possible to allow the aerial image to appear as if a real input key or a display panel for the inputting operation actually exists in a space. The inputting operation using the aerial image employs a theory such that the reflected light when the aerial image is touched by the object such as a finger or the like is focused at a point near the display source serving as a visible light generating unit in principle. The photosensitive elements as a photodetecting unit are arranged near the display source, and merely by detecting the reflected light, it is detected that the specific position of the aerial image has been touched, by the detection of the reflected light synchronized with the light emitting timings of the plurality of operating positions. Thus, the hardware necessary to realize the inputting and outputting functions using the aerial image is constructed by only the photosensitive elements arranged near the display sources and the circuit to discriminate the operating positions from the light emitting timings of the display sources and the photosensitive signals of the photosensitive elements, so that the apparatus can be extremely simply constructed. Since the 2-dimensional image (plane image) is displayed in a space, the solid aerial image can be also relatively easily displayed by further reciprocally scanning the 2-dimensional image in the depth direction.

The above and other objects, features, and advantages of the present invention will become more apparent from the following detailed description with reference to the drawings.

BRIEF DESCRIPTION OF THE DRAWINGS

FIG. 3 is an explanatory diagram of an light emitting/receiving unit in FIG. 1;

FIG. 4 is an exploded view of a light emitting key in FIG. 3;

FIGS. 8A to 8N are time charts for the operation of the controller of FIG. 7;

FIG. 11 is seen from a visible range;

FIG. 13 is seen from a visible range;

FIG. 15 is seen from a visible range;

FIGS. 23A to 23D are time charts for the operation of the controller which is used in FIG. 22;

FIGS. 27A to 27C are time charts for a position detection when the plane aerial image in FIG. 25 is touched by a finger;

FIG. 39 is an explanatory diagram of another embodiment which is used to display a solid aerial image; and FIG. 40 is a circuit block diagram of a controller which is used for the inputting/outputting operations using the solid aerial image in FIG. 36.

DETAILED DESCRIPTION OF THE PREFERRED EMBODIMENTS

[Input/output of aerial image using a real object]

Figure 1:
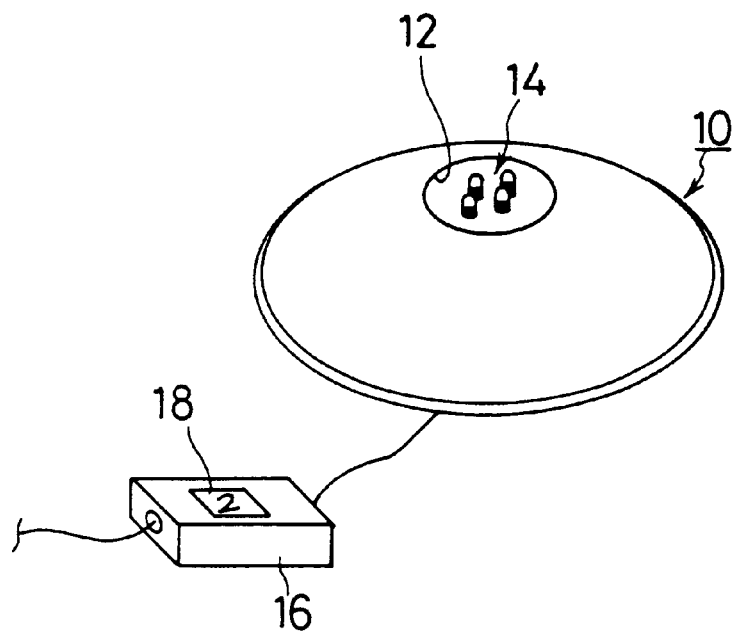
FIG. 1 is an explanatory diagram of the first embodiment of the invention using a parabola mirror unit.

FIG. 1 shows the first embodiment of an input/output apparatus using an aerial image of the invention. The input/output apparatus is constructed by a parabola mirror unit 10 which functions as an aerial image forming unit and a controller 16. As shown in an exploded view in FIG. 2, the parabola mirror unit 10 is constructed by a first parabola mirror 20 locating in the upper portion and a second parabola mirror 22 locating in the upper portion. In the first parabola mirror 20 locating in the lower portion, a parabola mirror surface 21 is formed on the inside and an opening 12 to form an aerial image is provided in a vertex portion of the mirror 20. In the second parabola mirror 22 locating in the lower portion, a parabola mirror surface 23 is formed on the inside and a light emitting/receiving unit 24 which functions as a visible light emitting unit and a photodetecting unit is attached to a bottom portion of the parabola mirror surface 23.

Figure 2:
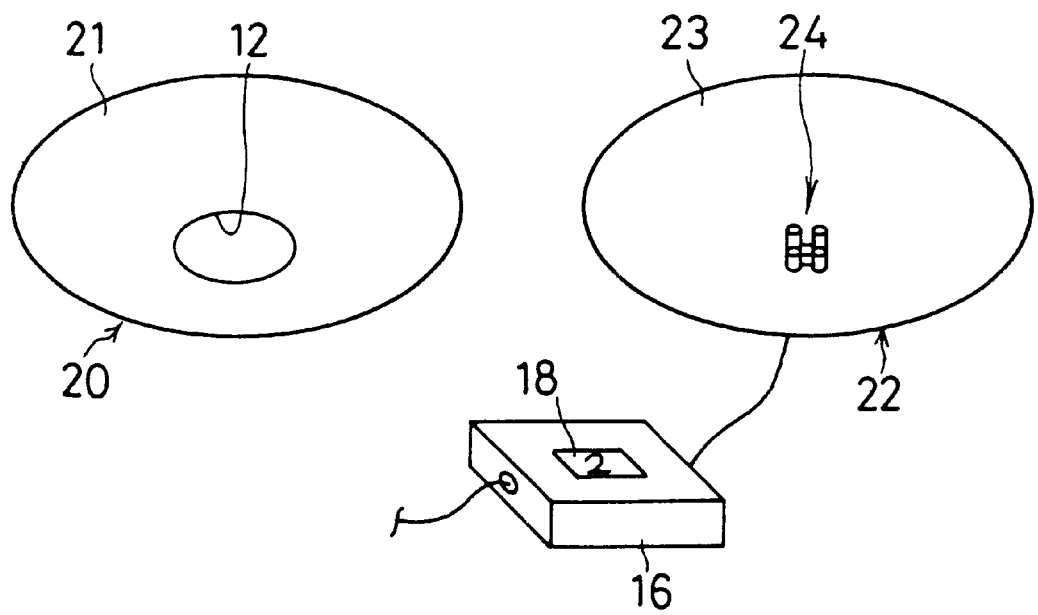
FIG. 2 is an exploded view of the parabola mirror unit in FIG. 1.

FIG. 3 shows the light emitting/receiving unit 24 provided for the parabola mirror 22 in FIG. 2. In the light emitting/receiving unit 24, four light emitting keys 26-1, 26-2, 26-3, and 26-4 are arranged on a rectangular printed circuit board 30. As shown in FIG. 4, a cap-shaped keytop 36 made of a transparent material is attached over an LED 44 in each of the light emitting keys 26-1 to 26-4. The keytop 36 is made of a transparent material and its about lower-half portion is formed as an opaque portion 40 by painting or the like and an upper side portion is formed as a transparent portion 38. In a vertex portion of the transparent portion 38, for example, numeral "1" is displayed as a mark 42 in the embodiment. Referring again to FIG. 3, the printed circuit board 30 has a supporting arm 32 which integratedly extends from one of the corners of the board 30. A connector portion 34 to connect to the controller side is formed at the edge of the supporting arm 32. In the connector portion 34, a connecting pattern for the LEDs 44 built in the light emitting keys 26-1 to 26-4 on the printed circuit board 30 is formed. At the center of the printed circuit board 30 having the four light emitting keys 26-1 to 26-4, a photosensitive element 28 which functions as a photodetecting unit for receiving the reflected light when an aerial image is touched by a finger or the like is provided. As shown in FIG. 2, the light emitting/receiving unit 24 is attached from the lower side so that the light emitting keys 26-1 to 26-4 and photosensitive element 28 on the printed circuit board 30 are projected to an inner bottom portion of the second parabola mirror 22 in FIG. 2. The controller 16 is connected to the connector portion 34 provided for the printed circuit board 30 by a signal line. An LED display 18 is provided in the upper portion of the controller 16, so that the number of the operated key can be displayed by an aerial image.

In a using state in FIG. 1, the controller 16 is connected to an information processing apparatus such as a personal computer or the like (not shown), operates by receiving a power supply, and sequentially drives the four light emitting keys 26-1 to 26-4 of the light emitting/receiving unit 24 built in the second parabola mirror 22 in FIG. 2 so as to emit a light, respectively. In a portion of the opening 12 of the parabola mirror unit 10, an aerial image 14 obtained by using the light emitting keys 26-1 to 26-4 of the light emitting/receiving unit 24 provided in the bottom portion of the second parabola mirror 12 as display sources appears. The aerial image 14 can be seen within a range of a predetermined angle around the parabola mirror unit 10. As for the aerial image 14, even in a state in which the light emitting/receiving unit 24 is not driven by the controller 16, if an ambient environment is sufficiently bright, the aerial image 14 of the light emitting/receiving unit 24 by the light which enters from the opening 12 appears. In the operating state by the controller 16, the aerial image 14 appearing in the opening 12 appears as keytops as if the whole light emitting keys are shining bright by the light emission driving of the LEDs built in the light emitting keys 26-1 to 26-4 as shown in FIG. 3. The aerial image 14 obtained by using the light emitting/receiving unit 24 as a display source is an actual image which is formed as a mirage by an optical system of the parabola mirror unit 10.

Figure 5:
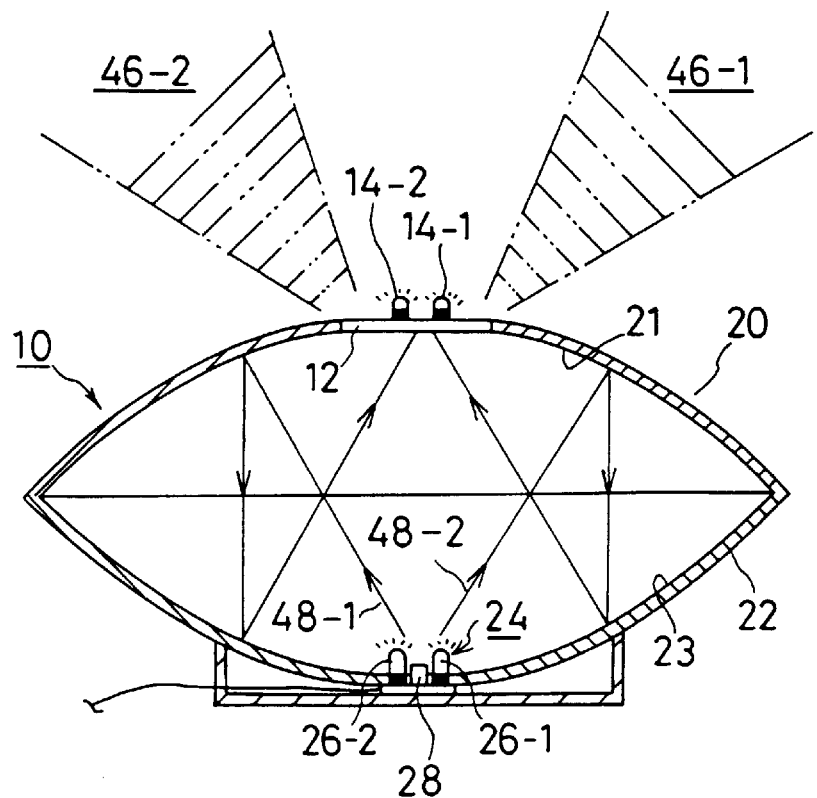
FIG. 5 is an explanatory diagram of an aerial image which appears by the embodiment in FIG. 1.

FIG. 5 is a sectional view of the parabola mirror unit 10 in FIG. 1. Edges of the light emitting keys 26-1 to 26-4 are projected to the bottom in the inside of the parabola mirror 22 of the lower portion of the parabola mirror unit 10 and an edge of the photosensitive element 28 is also projected. As shown by straight lines 48-1 and 48-2, the lights from the light emitting keys 26-1 and 26-2 of the light emitting/receiving unit 24 irradiate the parabola mirror surface 21 of the first parabola mirror 20 locating in the upper portion and are reflected as parallel lights. The parallel lights are reflected by the parabola mirror surface 23 of the parabola mirror 22 locating in the lower portion and form an image at a position where it faces the light emitting/receiving unit 24 of the opening 12 in the upper portion, thereby allowing aerial images 14-1 and 14-2 corresponding to the light emitting keys 26-1 and 26-2 to appear. With respect to the light emitting keys 26-3 and 26-4 (not shown) as well, corresponding aerial images 14-3 and 14-4 appear. The aerial images 14-1 and 14-2 formed at the opening 12 of the first parabola mirror 20 locating in the upper portion as mentioned above can be seen when the user puts the eyes into visible ranges 46-1 and 46-2 shown by alternate long and two short dashes lines. The visible ranges 46-1 and 46-2 are sectional portions and, actually, solid visible ranges each of which is obtained by rotating such a region by the half turn are formed.

Figure 6:
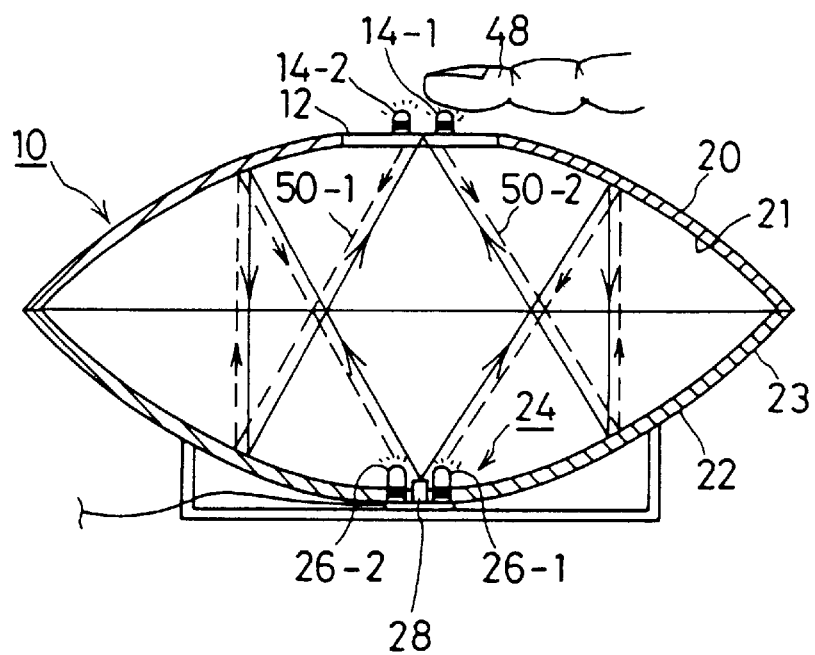
FIG. 6 is an explanatory diagram of the inputting operation when an aerial image in FIG. 1 is touched by a finger.

FIG. 6 shows a case where with respect to the aerial images 14-1 and 14-2 appearing in the opening 12 of the parabola mirror unit 10, the user touches the aerial image 14-1 by a finger 48 and performs a switching operation. When the user touches the aerial image 14-1 by the finger 48, since the light by the light emission driving of the light emitting key 26-1 provided for the internal light emitting/receiving unit 24 is formed as an image at the position of the aerial image 14-1, the light is reflected by an interposition of the finger 48 and becomes reflected lights 50-1 and 50-2 shown by broken lines. The reflected lights 50-1 and 50-2 reversely pass along the paths of the lights from the light emitting/receiving unit 24 and are returned to the position of the light emitting/receiving unit 24. In this case, a photosensitive range of the reflected lights in the light emitting/receiving unit 24 by the reflected lights 50-1 and 50-2 from the finger 48 occurs in almost the whole region of the light emitting/receiving unit 24. The photosensitive element 28 is provided at the center of the light emitting/receiving unit 24. The photosensitive element receives the reflected lights 50-1 and 50-2 from the finger 48 and generates a photosensitive output. Thus, the operating position of the aerial image 14-1 corresponding to the light emitting key 26-1 can be detected from the photosensitive output of the photosensitive element 28 by the reflected light from the finger 48. In this case, even when the user puts the finger 48 at any position of the aerial images 14-1 and 14-2, the photosensitive element 28 generates a photosensitive output of the reflected light. The operating position cannot be recognized from the reflected light itself. Therefore, according to the invention, the four light emitting keys 26-1 to 26-4 are sequentially driven so as to emit a light at a predetermined period and which one of the four aerial images 14-1 to 14-4 has been operated is discriminated from the timing for the light emission and the light receiving timing of the reflected light by the finger 48 and a corresponding switch signal is generated. As for a period of the light emission driving of the four light emitting keys 26-1 to 26-4 provided for the light emitting/receiving unit 24, in order to prevent that the flickering period is recognized by the eyes, the light is flickered at a period of 30 Hz or more.

Figure 7:
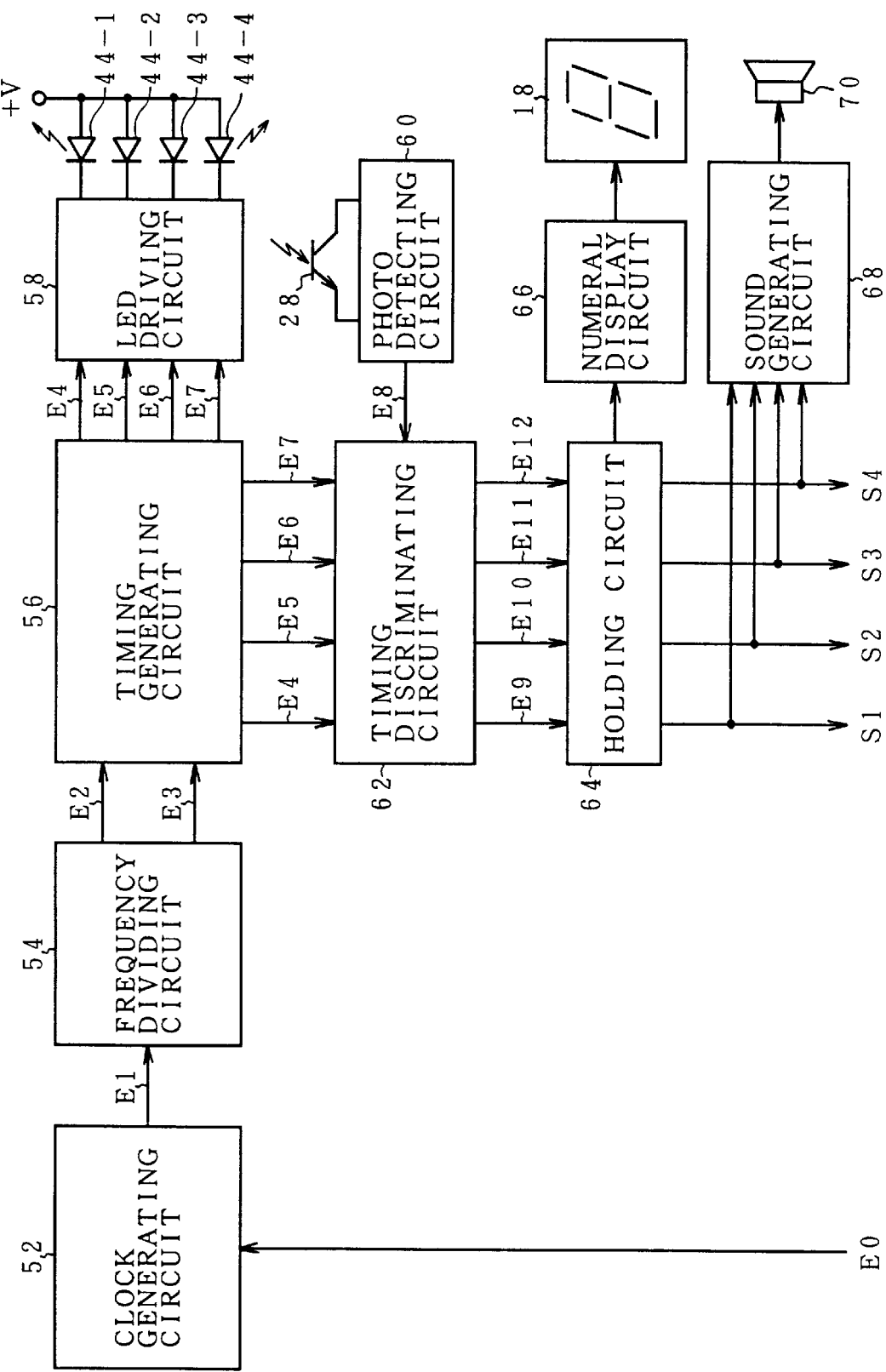
FIG. 7 is a circuit block diagram of a controller in FIG. 1.

FIG. 7 shows a circuit block diagram of the controller 16 provided for the parabola mirror unit 10 in FIG. 1. The controller 16 comprises: a clock generating circuit 52; a frequency dividing circuit 54; a timing generating circuit 56; an LED driving circuit 58; a photodetecting circuit 60; a timing discriminating circuit 62; a holding circuit 64; a numeral display circuit 66; the LED display 18; a sound generating circuit 68; and a speaker 70. The clock generating circuit 52 operates by receiving an enable signal E0 for permitting an input from an information processing apparatus such as a personal computer or the like connected to the outside and generates a clock E1 of FIG. 8A. The clock E1 decides a light emitting period of each of four LEDS 44-1 to 44-4 provided for the light emitting/receiving unit 24. The clock generating circuit 52 generates the clock signal E1 of, for example, 720 Hz having a mark width of about 1 msec during which the signal is at the H level and a space width of about 0.4 msec during which the signal is at the L level. The frequency dividing circuit 54 divides a frequency of the clock signal E1 from the clock generating circuit 52 into a ½ frequency dividing signal E2 of FIG. 8B and a ¼ frequency dividing signal E3 of FIG. 8C. The frequency dividing signals E2 and E3 from the frequency dividing circuit 54 are supplied to the timing generating circuit 56, thereby forming timing signals E4, E5, E6, and E7 of FIGS. 8D to 8G in order to make the LED driving circuit 58 drive the four LEDs 44-1 to 44-4 so as to emit a light. A period of each of the timing signals E4 to E7 is a period corresponding to the ¼ frequency dividing signal E3 of FIG. 8C. Since the clock signal E3 is set to 720 Hz, each period has a repetitive frequency of 180 Hz, which is equal to ¼ of 720 Hz. By supplying the timing signals E4, E5, E6, and E7 to the LED driving circuit 58 synchronously with the clock E1 for a light emitting period Ts, the LEDs 44-1, 44-2, 44-3, and 44-4 are sequentially driven so as to emit a light and those processes are repeated. Specifically speaking, the timing signals E4 to E7 are obtained by allowing the clock E1, ½ frequency dividing signal E2, and ¼ frequency dividing signal E3 to pass through a logic circuit to realize the following logic. In this instance, * denotes an inversion signal.

$$E4 = E2 \cdot E3 \cdot E1$$

$$E5 = {}^*E2 \cdot E3 \cdot E1$$

$$E6 = E2 \cdot {}^*E3 \cdot E1$$

$$E7 = {}^*E2 \cdot {}^*E3 \cdot E1$$

On the other hand, the timing signals E4 to E7 from the timing generating circuit 56 are simultaneously supplied to the timing discriminating circuit 62. A photodetection signal E8 from the photodetecting circuit 60 is inputted to the timing discriminating circuit 62. A photosensing signal of the photosensitive element 28 using, for example, a phototransistor or the like has been inputted to the photodetecting circuit 60. The photodetecting circuit 60 detects the reflected lights 50-1 and 50-2 when the user touches the aerial image 14-1 by the finger 48 as shown in FIG. 6 and generates the photodetection signal E8. The timing discriminating circuit 62 generates any one of discrimination signals E9 to E12 on the basis of the timing signals E4 to E7 and photodetection signal E8.

FIGS. 8H to 8L are time charts when the user touches the aerial image by the finger at the timing for the light emission driving of the LED 44-1. The photodetection signal E8 of FIG. 8H rises synchronously with the timing signal E4 of FIG. 8D to drive the LED 44-1 so as to emit a light. Therefore, the discrimination signal E9 of FIG. 8H rises by the AND of the timing signal E4 and photodetection signal E8. The holding circuit 64 holds the discrimination signal which first rises among the discrimination signals E9 to E12 from the timing discriminating circuit 62. Therefore, as shown by broken lines, the photodetection signal E8 subsequently rises synchronously with the timing signals E5, E6, and E7. As shown by broken lines in FIGS. 8J, 8K, and 8L, even if the discrimination signals E10, E11, and E12 are obtained, they are ignored. Thus, the holding circuit 64 generates a switch signal S1 corresponding to the discrimination signal E9 which first rose to the outside. The holding circuit 64 is constructed by a retrigger timer. When the discrimination signal E9 rises again within 0.5 second, the holding circuit 64 performs a retrigger operation. When the discrimination signal E9 is not inputted for 0.5 second or more, the holding circuit 64 generates a holding clear signal of FIG. 8N and releases the holding operation. When the holding circuit 64 performs a holding output of the switch signal S1 as shown in FIG. 8M, the holding signal of the switch signal S1 is supplied to the numeral display circuit 66 and the numeral "1" provided on the keytop of the light emitting key of the LED 44-1 corresponding to the operated aerial image, namely, the light emitting key 26-1 in FIG. 3 is displayed on the LED display 18, so that the operator can confirm the operating switch of the aerial image. When the switching operation is performed by touching the aerial image by the finger, since the aerial image is an insubstantial image which doesn't physically exist, an operation feeling obtained by touching the aerial image by the finger cannot be derived. In the controller in FIG. 7, therefore, the sound generating circuit 68 is provided, an operation sound is generated by the speaker 70 when any one of switch signals S1 to S4 is outputted from the holding circuit 64, thereby realizing a tactile feedback as a sensory feedback such that a switch has been turned on. That is, according to the controller in FIG. 7, a visible tactile feedback by the LED display 18 and an auditory tactile feedback by the operation sound from the speaker 70 are realized.

Figure 9:
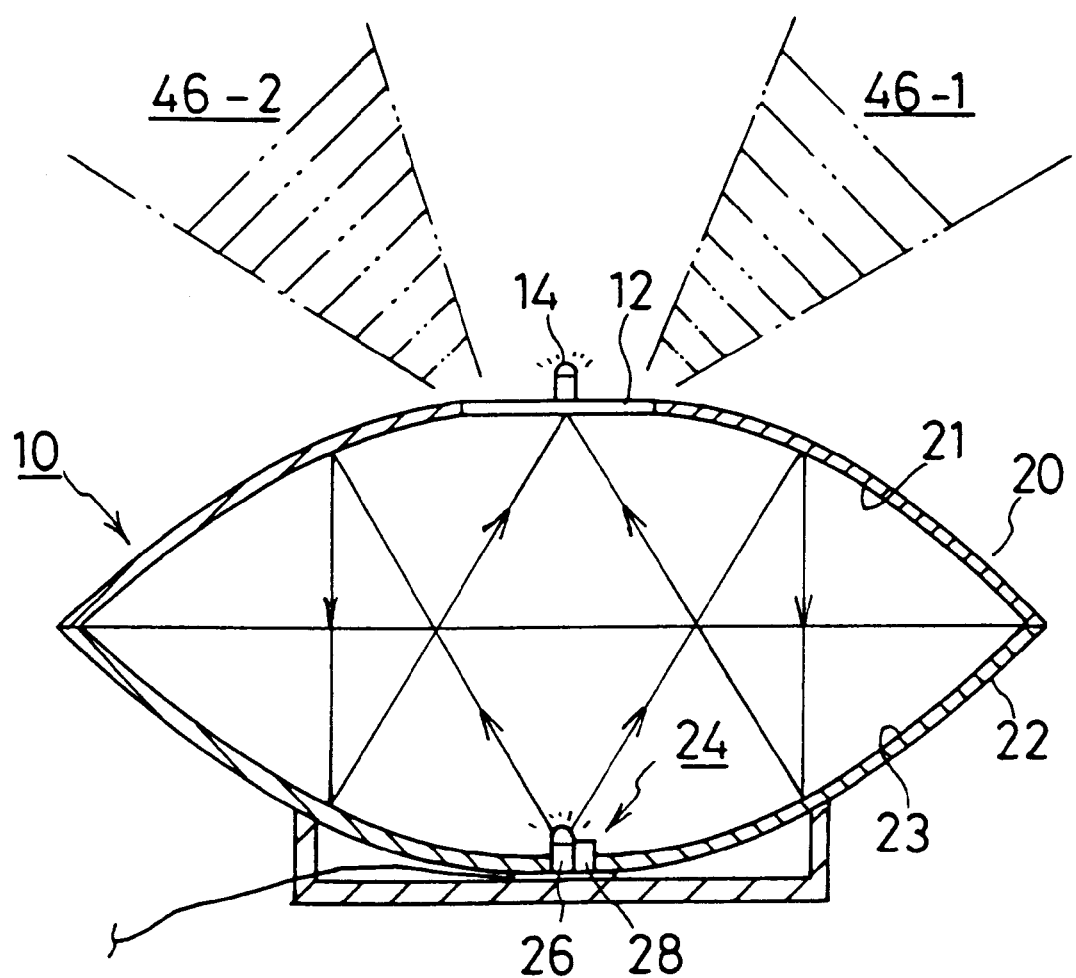
FIG. 9 is an explanatory diagram of a modification of the embodiment in FIG. 1 in which one light emitting key is used.

FIG. 9 shows a modification of the first embodiment of FIG. 1 and is characterized by providing one light emitting key 26 for the light emitting/receiving unit 24 built in the parabola mirror unit 10. When one light emitting key 26 is provided as well, in a manner similar to the above, an LED of the light emitting key 26 is driven so as to intermittently emit a light, thereby allowing the aerial image 14 to appear in the opening 12. The photosensitive element 28 is arranged at a position adjacent to the light emitting key 26. By performing the switching operation by the finger while observing the aerial image 14 appearing in the opening 12 from the visible ranges 46-1 and 46-2, the reflected light is received and a switch output is performed to the outside.

Figure 10:
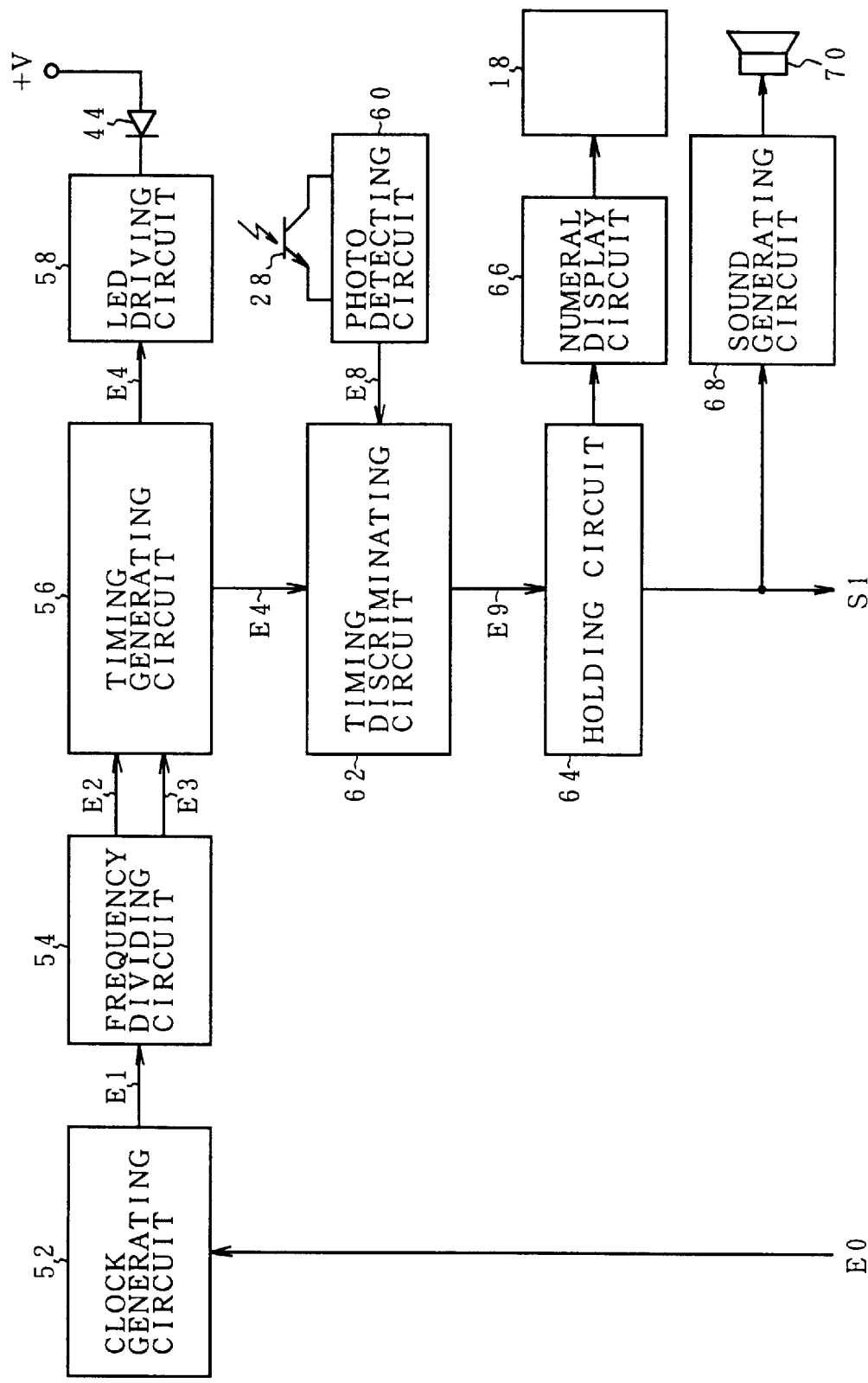
FIG. 10 is a circuit block diagram of a controller which is used in FIG. 9.

FIG. 10 is a circuit block diagram of the controller for controlling the parabola mirror unit 10 in FIG. 9 as a target. The construction is fundamentally the same as that in the case in FIG. 8 where a plurality of LEDs are used. There are the following differences between them. Since there is one light emitting key 26, the LED to be driven by the LED driving circuit 58 is also only the LED 44. The timing generating circuit 56 generates only the timing signal E4 of FIG. 8D and the timing discriminating circuit 62 also generates the discrimination signal E9 by only the AND of the photodetection signal E8 from the photodetecting circuit 60 and the timing signal E4. Therefore, the holding circuit 64 also generates only the switch signal S1 by the operation of the light emitting key 26 having the LED 44. The construction other than the above-mentioned differences is substantially the same as that of the controller in FIG. 7. As mentioned above, according to the first embodiment in which the parabola mirror unit 10 is used, a plurality of light emitting keys can be provided for the light emitting/receiving unit 24 or a single light emitting key can be also provided. The light emitting keys of the number which can be displayed as aerial images 14 in the portion of the opening 12 of the parabola mirror unit 10 can be used. In the parabola mirror unit 10, although the opening 12 is opened, it is not always necessary to open the opening 12. It is desirable to prevent that dusts or foreign matters enter the inside of the apparatus by covering the opening 12 by a transparent material such as glass, plastic, or the like.

Figure 11:
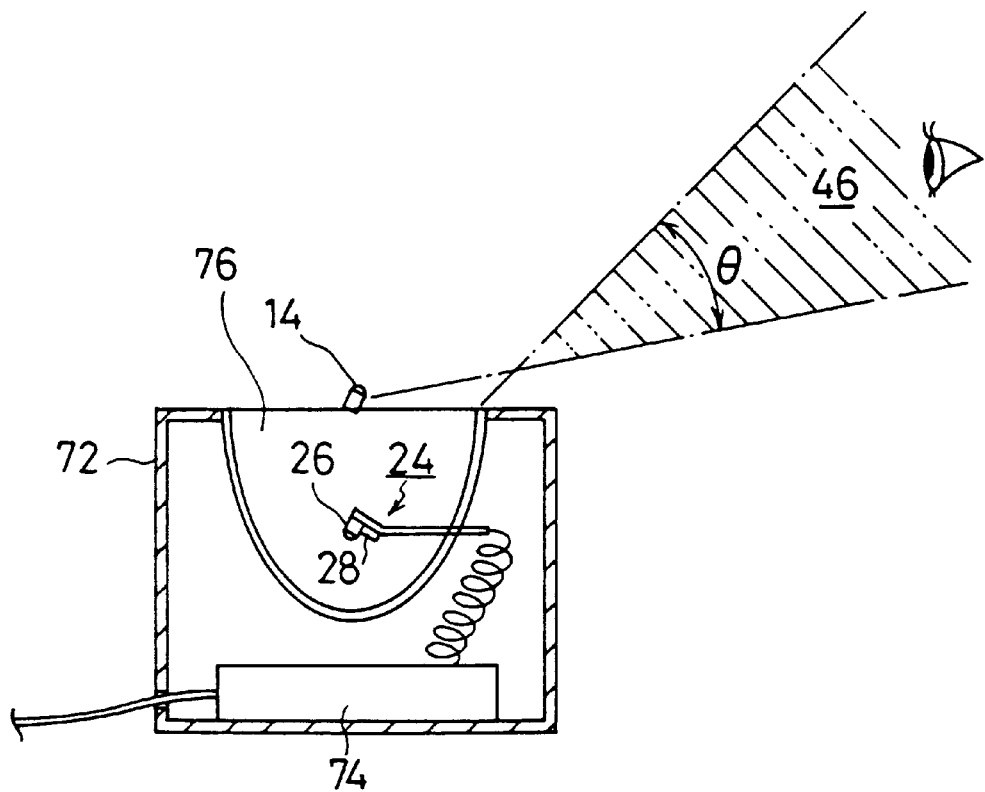
FIG. 11 is a sectional view of the second embodiment of the invention using a rotational ellipsoidal mirror.

FIG. 11 shows the second embodiment of the input/output apparatus of the invention which is characterized by using a rotational ellipsoidal mirror as an aerial image forming unit for forming an aerial image of an input operating unit. As is well known, two focal points of the first and second focal points exist in an ellipse and a light emitted from one focal point is converged to another focal point. Even in a rotational ellipsoid obtained by rotating such an ellipse by using its major axis as an axis, the same characteristics are obtained. As for a general expression of the ellipse and its focal positions, when assuming that a radius in the major axial direction is set to (a) and a radius in the minor axial direction is set to (b), a general expression in the X and Y coordinates of the ellipse is as follows.

$(X^2/a^2)+(Y^2/b^2)=1$

Therefore, coordinates of the focal points of the ellipse are expressed as follows.

$X$ coordinate$=\pm(a^2-b^2)^{1/2}$ $Y$ coordinate$=0$

After an ellipse of, for example, a=50 mm and b=40 mm was cut on the Y axis, in a rotational ellipsoidal mirror 76 obtained by rotating the ellipse around the X axis as a center, the focal points are located at positions of −30 mm and +30 mm on the X axis. In the rotational ellipsoidal mirror 76, the light emitting/receiving unit 24 having the light emitting key 26 and photosensitive element 28 is located near the first focal point, thereby enabling the aerial image 14 of the light emitting/receiving unit 24 to appear near the second focal point. The rotational ellipsoidal mirror 76 is enclosed in a casing 72. A controller 74 is built in the casing 72. As for the light emitting/receiving unit 24 enclosed in the rotational ellipsoidal mirror 76, it is an important point that the light emitting key 26 and photosensitive element 28 are directed to the direction opposite to that of the eyes in the visible range 46. This is because the light emitting key 26 is not actually a point light source and a spread angle of a luminous flux from the light emitting key 26 is equal to only about 20°. When directing the light emitting key 26 to the direction of the bottom of the rotational ellipsoidal mirror 76, the light to form the aerial image 14 from the light emitting/receiving unit 24 cannot be effectively used. Therefore, by directing the light emitting key 26 to the direction opposite to the positions of the eyes from the visible range 46, even when a spread of the luminous flux from the light emitting key 26 is narrow, it is possible to allow the aerial image 14 to efficiently appear near the second focal point.

Figure 12:
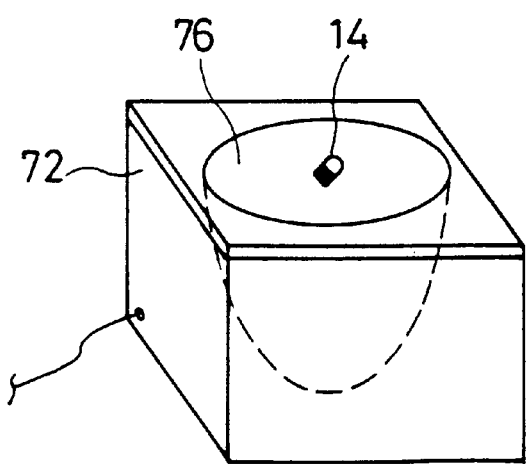
FIG. 12 is an explanatory diagram when

FIG. 12 shows a state of the aerial image 14 which is seen from the visible range 46 in FIG. 11. When touching the aerial image 14 formed as a keytop by the finger, its reflected light is detected by the photosensitive element 28 of the light emitting/receiving unit 24 installed near the first focal point of the rotational ellipsoidal mirror 76 and a switch signal is outputted to the information processing apparatus side by the controller 74. According to the second embodiment in FIGS. 11 and 12 as well, in order to prevent that dusts or foreign matters enter the inside of the rotational ellipsoidal mirror 76, it is desirable to provide a cover for the opening by using a transparent plate such as glass, plastic, or the like. A construction of the circuit of the controller 74 is substantially the same as that in the case where one LED 44 is provided.

Figure 13:
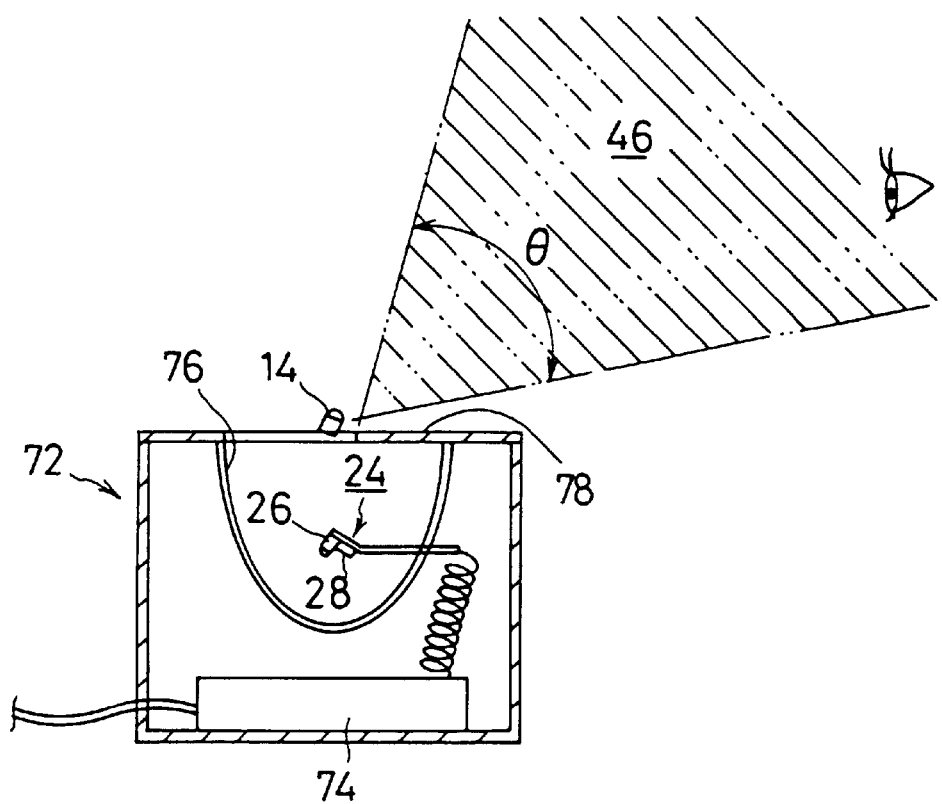
FIG. 13 is a sectional view of the third embodiment of the invention using a rotational ellipsoidal mirror.
Figure 14:
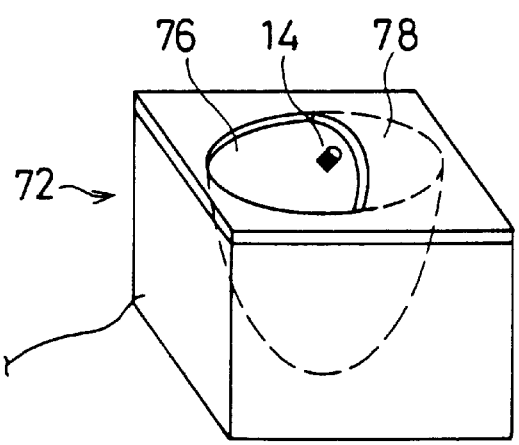
FIG. 14 is an explanatory diagram when

FIG. 13 shows the third embodiment of the input/output apparatus of the invention which is characterized in that the visible range 46 in the second embodiment in FIG. 11 is enlarged. An angle θ indicative of the visible range of the aerial image 14 in the embodiment using the rotational ellipsoidal mirror 76 in FIG. 11 is equal to about 40° that is not sufficiently wide. A factor by which the visible range 46 is limited is because when exceeding a boundary on the upper side of the visible range 46, the eyes directly receive the light from the light emitting key 26. When seeing the rotational ellipsoidal mirror 76 over the boundary on the upper side of the visible range 46, the light emitting key 26 in the mirror is directly seen and a focal point of the eyes is attracted to the direction of the existing light emitting key 26, so that the aerial image 14 cannot be seen as a real image. In FIG. 13, the side of the opening of the rotational ellipsoidal mirror 76 near the eyes is covered by an opaque cover 78, thereby preventing that the light emitting key 26 is directly seen. The cover 78 covers almost the half portion of the looking side of the opening of the rotational ellipsoidal mirror 76 as shown in FIG. 14. By providing the cover 78 for the opening of the rotational ellipsoidal mirror 76, as shown in FIG. 13, the angle θ indicative of the visible range 46 can be enlarged to 80° which is almost twice as large as about 40° in case of FIG. 11.

Figure 15:
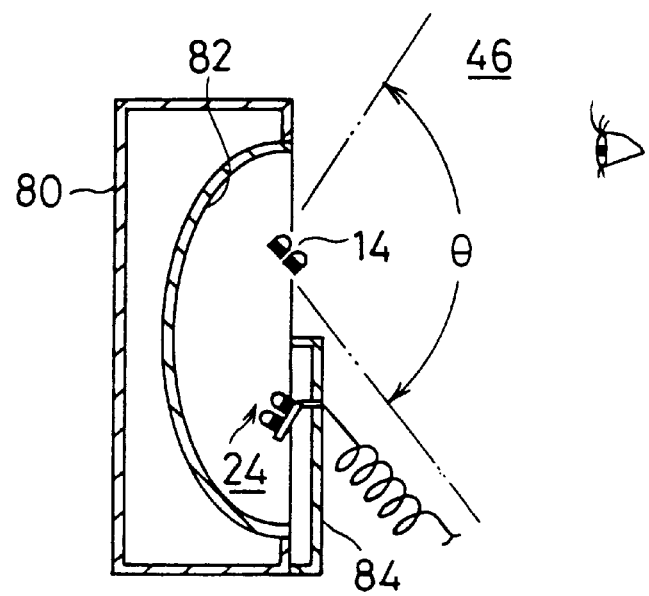
FIG. 15 is a sectional view of the fourth embodiment of the invention using a vertical rotational ellipsoidal mirror.

FIG. 15 shows the fourth embodiment of the invention in which the rotational ellipsoidal mirror is used and which is characterized in that the visible range is further enlarged. A vertical rotational ellipsoidal mirror 82 enclosed in a casing 80 has a shape obtained by vertically dividing a rotational ellipsoid along the major axis as compared with the case where the rotational ellipsoid is cut in round slices in the minor axial direction in FIGS. 11 and 13. Such a mirror is called a vertical rotational ellipsoidal mirror. The light emitting/receiving unit 24 is arranged near the first focal point in the lower portion of the vertical rotational ellipsoidal mirror 82. A front cover 84 is provided on this side of the opening in which the light emitting/receiving unit 24 is enclosed. When driving the light emitting key provided for the light emitting/receiving unit 24 so as to emit a light, the aerial image 14 appears near the second focal point locating in the opening in the upper portion of the vertical rotational ellipsoidal mirror 82. As for the visible range 46 of the aerial image 14, since the light emitting/receiving unit 24 is not directly seen because of the existence of the front cover 84, the wide visible range 46 which spreads to about 120° can be obtained as an angle θ.

Figure 16:
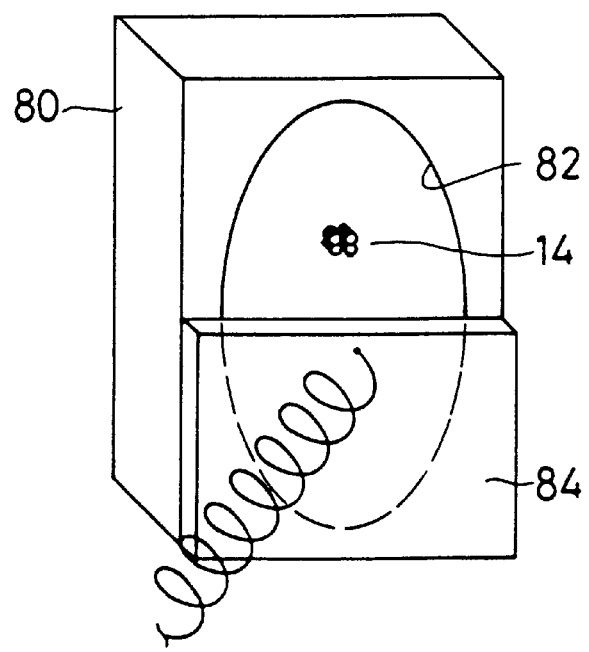
FIG. 16 is an explanatory diagram when

FIG. 16 shows a state in which the structure of FIG. 15 is seen from the visible range 46. The clear aerial image 14 appears near the second focal point in the opening of the vertical rotational ellipsoidal mirror 82 of the upper portion. When the aerial image 14 appears in front of the casing 80, the user can see the aerial image 14 without being almost aware of the position of the casing and can perform the switching operation to touch the aerial image 14 by the finger or the like. As will be obviously understood from FIG. 15, in the light emitting/receiving unit 24 installed near the first focal point of the vertical rotational ellipsoidal mirror 82, by setting the direction of the light emitting key to a slightly upward direction instead of the horizontal direction, the light from the light emitting key can be efficiently converged to a position near the second focal point. Thus, the clear aerial image 14 can be allowed to appear.

Figure 17:
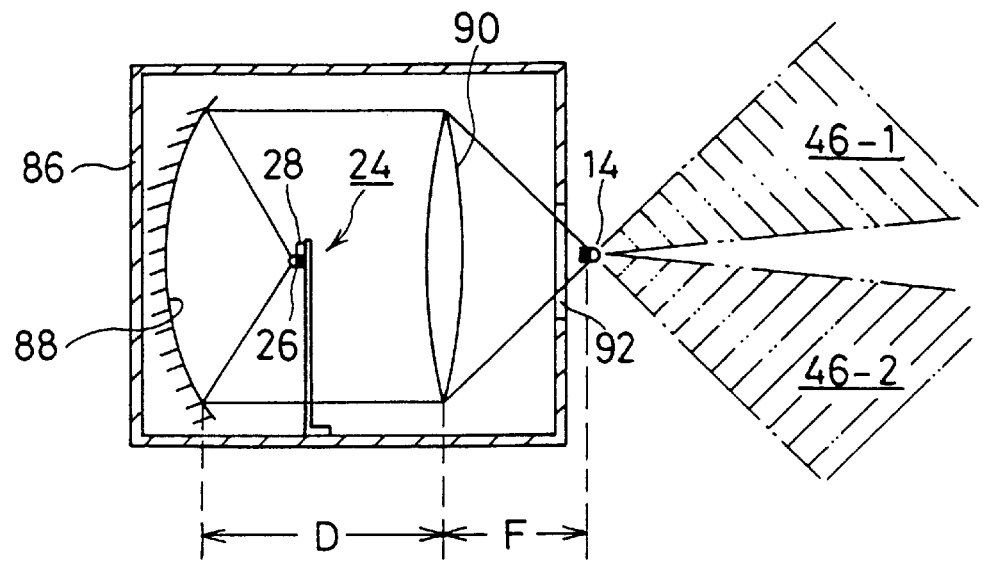
FIG. 17 is a sectional view of the fifth embodiment of the invention using a parabola mirror and a convex lens.

FIG. 17 shows the fifth embodiment of the input/output apparatus of the invention which is characterized in that a certain degree of freedom is provided for an arrangement of the optical system for allowing the aerial image to appear. That is, according to the first embodiment using the parabola mirror and the second and fourth embodiments using the rotational ellipsoidal mirror, the position of the light emitting/receiving unit serving as a display source and the appearing position of the aerial image by the optical system are unconditionally decided by the optical system which is used and a distance between them or the like cannot be changed in principle. On the other hand, in FIG. 17, the position of the light emitting/receiving unit and the position of the aerial image can be properly changed as necessary. That is, as an optical system to allow the aerial image to appear, a parabola mirror 88 and a convex lens 90 are enclosed in a casing 86. The light emitting/receiving unit 24 is arranged at the focal position of the parabola mirror 88. The light from the light emitting key 26 is reflected by the parabola mirror 88 and is converted into the parallel light. The convex lens 90 is arranged on the opening side of the parabola mirror 88 so as to be away from the parabola mirror 88 by a distance D. The convex lens 90 converges the parallel light reflected by the parabola mirror 88 and allows the aerial image 14 of the light emitting key 26 provided for the light emitting/receiving unit 24 to appear near an opening 92 of the casing 86 by an image formation. The visible range of the aerial image 14 in this case is a solid region in which the visible ranges 46-1 and 46-2 around the optical axis excluding portions near the optical axis are set to sectional surfaces. When touching the aerial image 14 appearing at the focal position of a focal distance F of the convex lens 90 near the opening 92 by the finger, its reflected light passes through a reverse path and is received by the photosensitive element 28 of the light emitting/receiving unit 24, so that the switching operation is detected and a switch signal can be generated. As a convex lens 90, a lens having the focal distance F which is equal to or less than ½ of an effective lens aperture is desired in order to widen the visible ranges 46-1 and 46-2. As a convex lens 90, a lens having a large effective aperture is also desired. Therefore, a Fresnel lens having the same converging function as that of the convex lens in which a number of circular areas having different angles of refraction of the light are concentrically arranged is used. Since a thickness of Fresnel lens is thin, a weight is light and the costs are inexpensive. The convex lens 90 is not limited to one lens but it is also possible to obtain the desired focal distance F by combining a number of lenses. In this instance, since the light from the light emitting key 28 is once converted into the parallel light by the parabola mirror 88, the distance D between the parabola mirror 88 and convex lens 90 can be set to an arbitrary value in principle. Since it is actually difficult to form the complete parallel light by the parabola mirror 88, although there is a certain degree of restriction in the distance D, even when the distance D is changed from, for example, 10 cm to about 100 cm, the aerial image 14 can be correctly formed at the focal position of the focal distance F of the convex lens 90. As mentioned above, according to the fifth embodiment of FIG. 17, a degree of freedom is obtained for the distance D between the parabola mirror 88 and convex lens 90.

Figure 18:
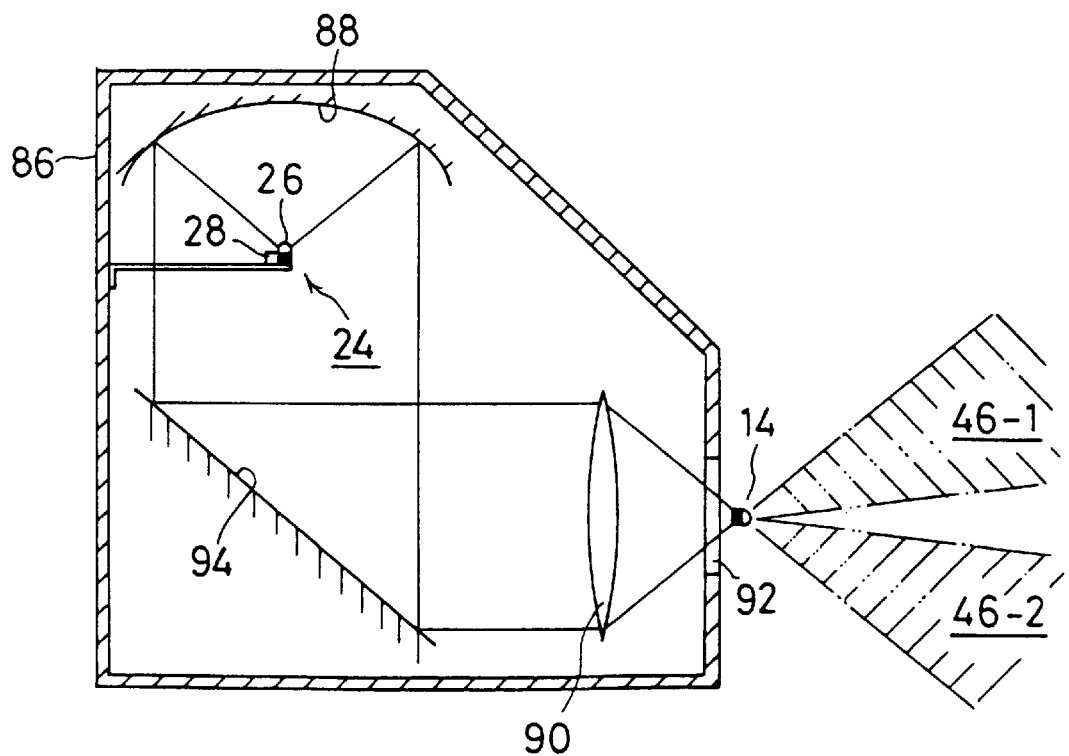
FIG. 18 is a sectional view of the embodiment in which optical path direction in FIG. 17 is deflected.

FIG. 18 shows a modification of the embodiment of FIG. 17. By arranging a plane mirror 94 between the parabola mirror 88 and convex lens 90 so as to be inclined, for example, at 45° for the optical axis from the parabola mirror 88, the arranging direction can be changed in addition to the distance D between them. The arrangement angle of the plane mirror 94 can be arbitrarily selected within a range of, for example, 0° to 80°, so that the optical path can be changed within a range of 0° to 160°. In this instance, an area which cannot be seen at positions near the center of the optical axis of the visible ranges 46-1 and 46-2 of the aerial image 14 in FIGS. 17 and 18 occurs because the parallel light from the parabola mirror 88 is obstructed by arranging the light emitting/receiving unit 24 in front of the parabola mirror 88. Therefore, it is desirable to miniaturize the light emitting/receiving unit 24 as possible so as not to obstruct the visible range. As for the opening 92, it is desirable to provide a transparent cover made of glass, plastic, or the like in order to prevent an invasion of dusts or foreign matters.

Figure 19:
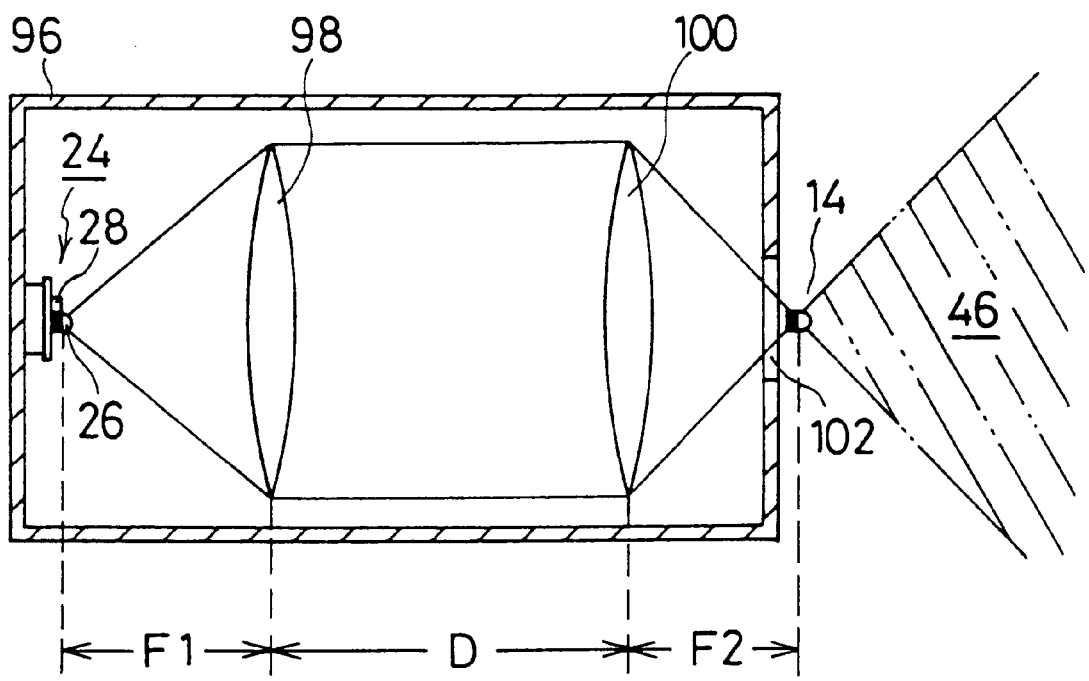
FIG. 19 is a sectional view of the sixth embodiment of the invention using a pair of convex lenses.

FIG. 19 shows the sixth embodiment of the input/output apparatus of the invention which is characterized by constructing an optical system in which an invisible range near the optical axis in the fifth embodiment in FIG. 17 is eliminated. According to the sixth embodiment, a first convex lens 98 is arranged in a casing 96 and the light emitting/receiving unit 24 is arranged at the focal position which is away from the first convex lens 98 by a focal distance F1. The light from the light emitting key 26 provided for the light emitting/receiving unit 24 is converged by the first convex lens 98 and is converted to a parallel light. A second convex lens 100 is arranged so as to be away from the first convex lens 98 by a predetermined distance D. The second convex lens 100 is located on the side opposite to the casing 96. By setting a focal distance F2 of the lens 100 to a position near the opening 102, the parallel light from the first convex lens 98 is converged, thereby forming the aerial image 14 of the light emitting key 26 at the focal position. In this case, since a member which obstructs the light doesn't exit on the optical path of the light from the light emitting key 26, even if the visible range 46 of the aerial image 14 exists near the optical axis, it is effective and no invisible range exists. According to the sixth embodiment as well, there is a degree of freedom in the distance D between the first and second convex lenses 98 and 100 and an arbitrary installation distance can be set as necessary. In a manner similar to the case shown in FIG. 18, by arranging the plane mirror 94 between the first and second lenses, the optical path can be changed to a predetermined direction.

[Input/output of plane aerial image using 2-dimensional image display unit]

Figure 20:
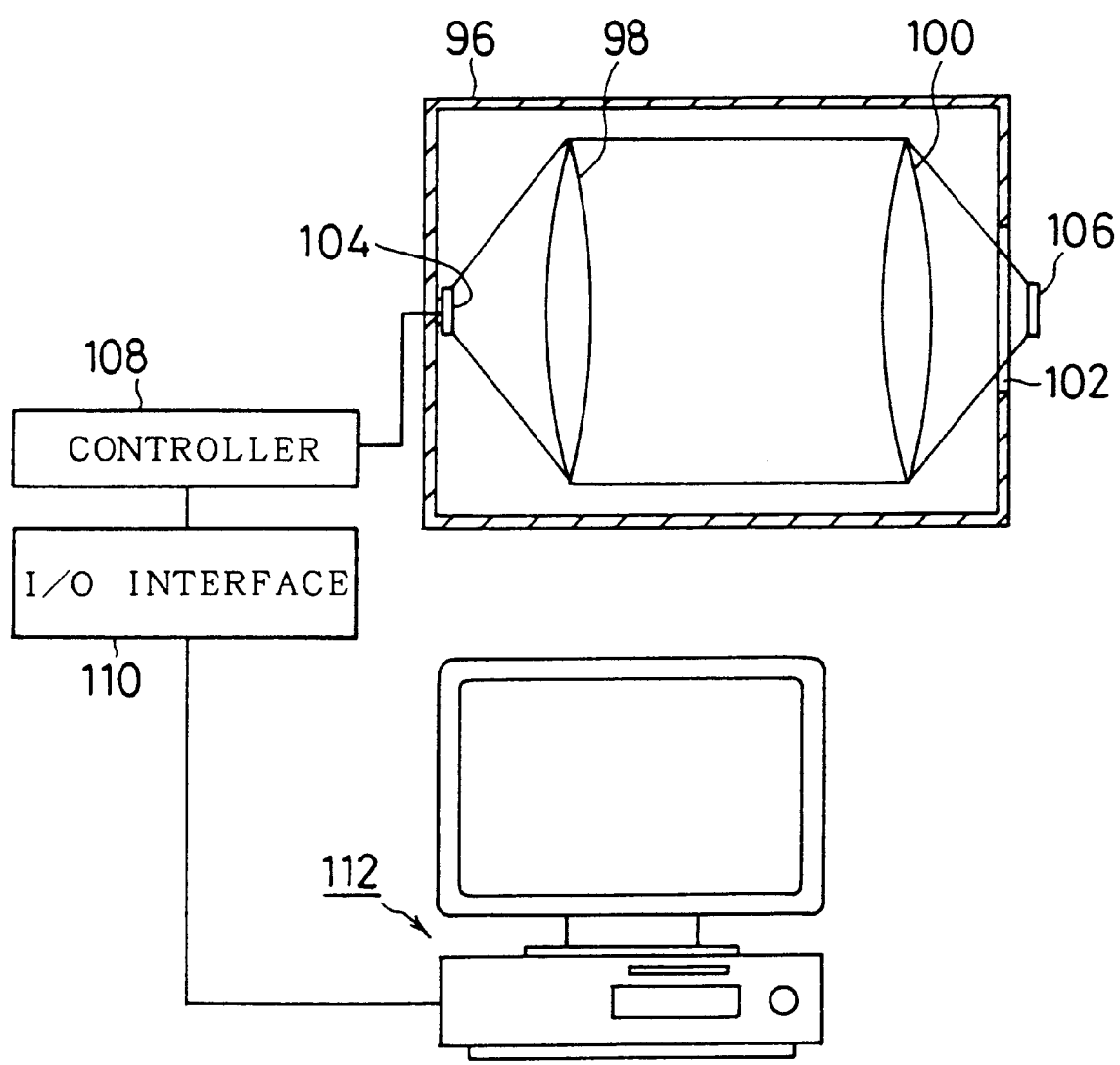
FIG. 20 is an explanatory diagram of the seventh embodiment of the invention using a two-dimensional image generator.

FIG. 20 shows the seventh embodiment of the input/output apparatus using the aerial image of the invention and is characterized by using a 2-dimensional display unit in which light emitting elements are two-dimensionally arranged in the vertical and lateral directions as a visible light generating unit serving as display sources of the aerial image. The same optical system as that in FIG. 19 which has the first and second convex lenses 98 and 100 and in which the lens distance D can be freely set is built in the casing 96. A 2-dimensional image generator 104 is arranged at the focal position of the first convex lens 98. The 2-dimensional image generator 104 is connected to a controller 108 and is further connected as an input/output device for an external personal computer 112 through an input/output interface (I/O I/F) 110.

Figure 21:
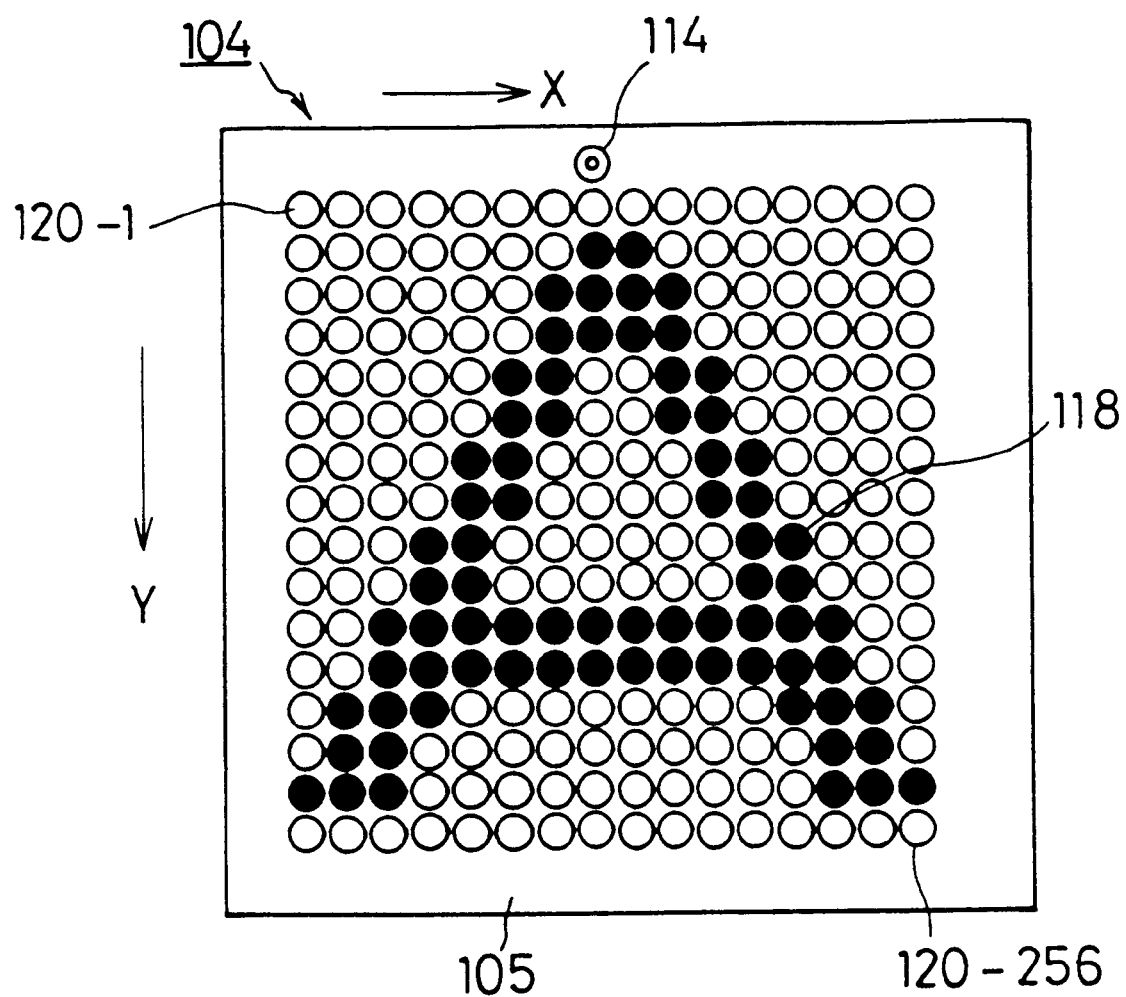
FIG. 21 is an explanatory diagram of a 2-dimensional image generator in FIG. 20.

FIG. 21 is an enlarged diagram of the 2-dimensional image generator 104 in FIG. 20. In the 2-dimensional image generator 104, total 256 LEDs 120-1 to 120-256 are arranged by arranging 16 LEDs on a board 105 in each of the X direction as a lateral direction and the Y direction as a vertical direction. In the center edge on the upper side of the display unit in which the LEDs 120-1 to 120-256 are arranged, a photosensitive element 114 is arranged to receive the reflected light when an aerial image is touched by a finger. A plurality of photosensitive elements can be also arranged in the vertical direction, the lateral direction, or the like. The 2-dimensional image generator 104 can display, for example, "A" as shown in FIG. 21 by driving the display on the basis of prepared image information of total 256 dots in which 16 dots are arranged in each of the vertical and lateral direction. In this case, the 256 LEDs 120-1 to 120-256 are dynamically lit on so as to sequentially emit the light from each LED. In order to obtain a display image having no flickering, it is necessary to repeat 60 image planes or more every second. For this purpose, as a clock frequency to display an image plane of 256 elements, a frequency of $$256 \text{ elements} \times 60 \text{ Hz} = 15.36 \text{ kHz}$$

or higher is needed.

Figure 22:
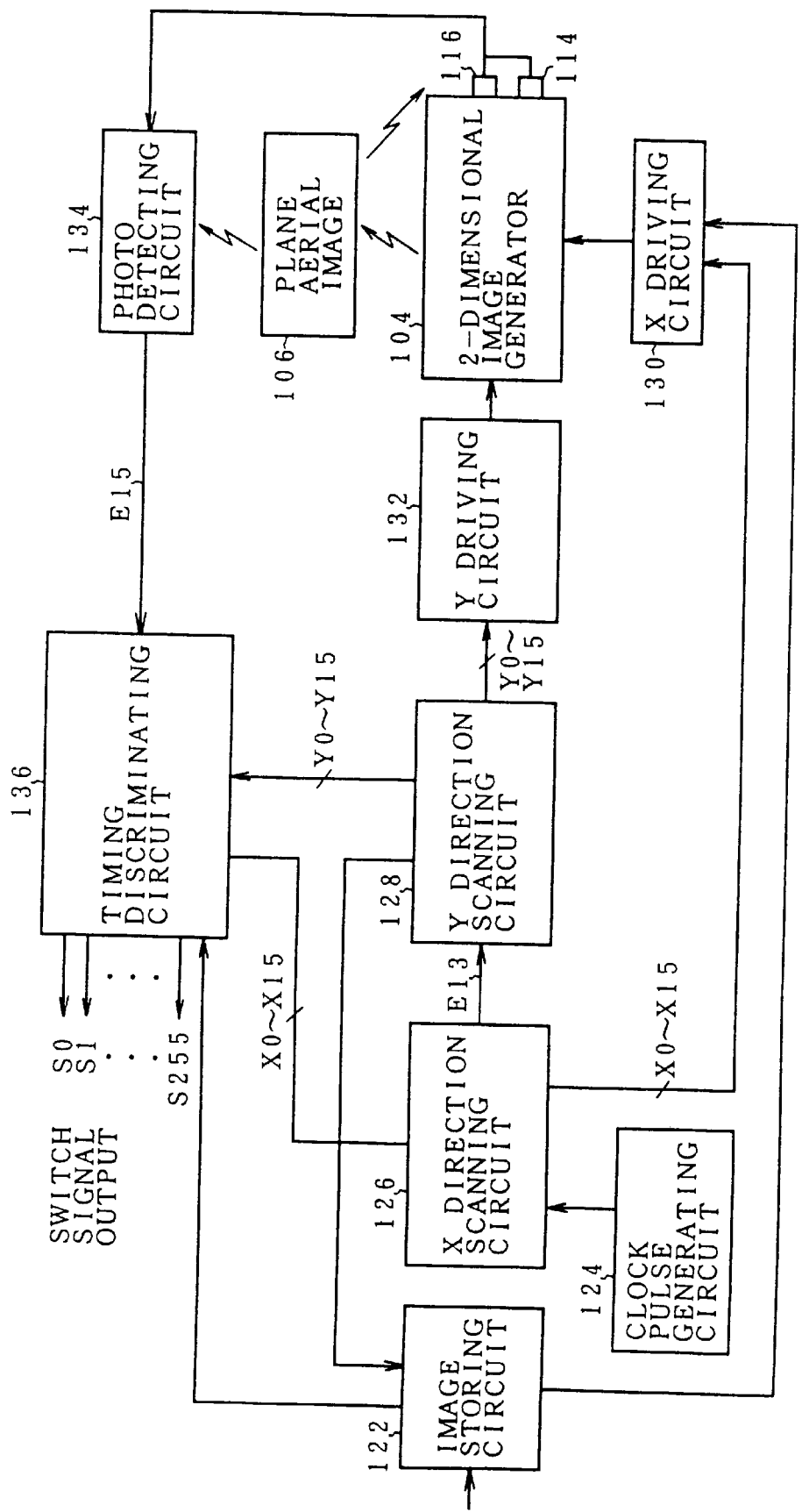
FIG. 22 is a circuit block diagram of a controller which is used in FIG. 21.

FIG. 22 is a circuit block diagram of the controller 108 in FIG. 20. The controller 108 for allowing the aerial image to appear by driving the 2-dimensional image generator 104 in FIG. 21 comprises: an image storing circuit 122; a clock pulse generating circuit 124; an X direction scanning circuit 126; a Y direction scanning circuit 128; an X driving circuit 130; a Y driving circuit 132; a photodetecting circuit 134; and a timing discriminating circuit 136. As an image storing circuit 122, for example, an image buffer memory such as image storing matrix circuit, RAM, or the like in which image information has fixedly been stored can be used. In an image input matrix circuit, 16 X lines in the vertical direction pulled up to a power source and 16 Y lines in the lateral direction connected to an input of a driver are wired in a lattice shape, their cross points are made correspond to the LEDs 120-1 to 120-256 of the 2-dimensional image generator 104 in FIG. 21, and cross positions corresponding to the display elements are connected by diodes, thereby fixedly storing the image information. When an image buffer memory is used as an image storing circuit 122, as shown in FIG. 20, the image information formed by the personal computer 112 connected through the I/O I/F 110 is transferred and stored. For example, in case of 256 elements constructed by arranging 16 elements in each of the X and Y directions, in order to enable 60 picture planes or more to be repetitively displayed every second, the clock pulse generating circuit 124 generates clock pulses of, for example, 15.36 kHz or higher as shown in FIG. 23A. The clock pulse from the clock pulse generating circuit 124 is supplied to the X direction scanning circuit 126. The X direction scanning circuit 126 has a counter for counting the clocks in FIG. 23A with respect to 16 elements in the X direction. The counter is cleared every 16 counts in FIG. 23B. X direction scanning signals X0 to X15 in FIG. 23C are sequentially generated synchronously with count outputs 0 to 15 of the counter. When the generation corresponding to an X direction scanning period Tx of the X direction scanning signals X0 to X15 is finished, the X counter is cleared by an X count clear signal. The above processes are repeated every period Tx. The Y direction scanning circuit 128 has a Y counter for inputting the X count clear signal in FIG. 23B indicative of the period Tx of the X direction scanning signals X0 to X15 and for similarly counting 16 counts of 0 to 15 and sequentially generates Y direction scanning signals Y0, Y1, . . . , and Y15 every period Tx. When a count value of the Y counter reaches 15, the Y counter is cleared by the X count clear signal. The above processes are repeated. That is, when assuming that a period of the Y direction scanning signals Y0 to Y15 is set to Ty, there is a relation of (Ty=16×Tx). The X direction scanning signals X0 to X15 from the X direction scanning circuit 126 are supplied to the X driving circuit 130 and, at the same time, the Y direction scanning signals Y0 to Y3 from the Y direction scanning circuit 128 are supplied to the Y driving circuit 132. For example, with respect to the first X0 line, the X driving circuit 130 and Y driving circuit 132 sequentially validate the X direction scanning signals X0 to X15 in a state in which the Y direction scanning signal Y0 is valid and drive the 16 LEDs 120-1 to 120-16 of the top X line in the 2-dimensional image generator 104 in FIG. 21. In this instance, pixel signals of the dots corresponding to the same X direction line are simultaneously supplied from the image storing circuit 122 to the X driving circuit 130 synchronously with the clocks. By varying an X direction scanning voltage in accordance with the pixel signal, the display activation of the LED is changed. By repeating the above processes with respect to the Y direction scanning signals Y0 to Y15, for example, "A" can be displayed as an image 118 of one picture plane as shown in FIG. 21.

Figure 24:
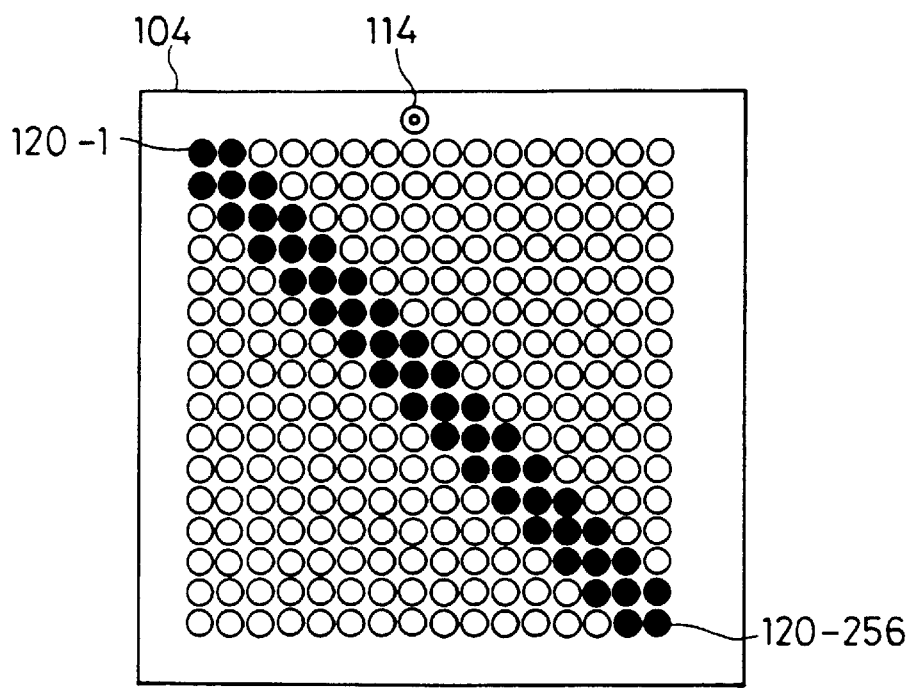
FIG. 24 is an explanatory diagram of a display image by the 2-dimensional image generator in FIG. 20.
Figure 25:
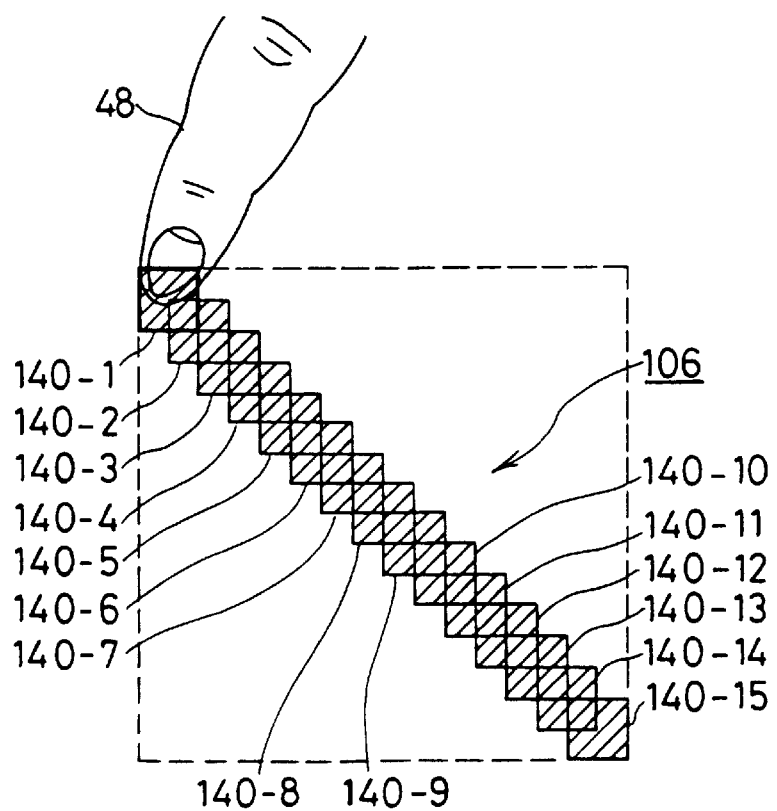
FIG. 25 is an explanatory diagram of a plane aerial image which appears in the display image in FIG. 20 and switch portions thereof.
Figure 26:
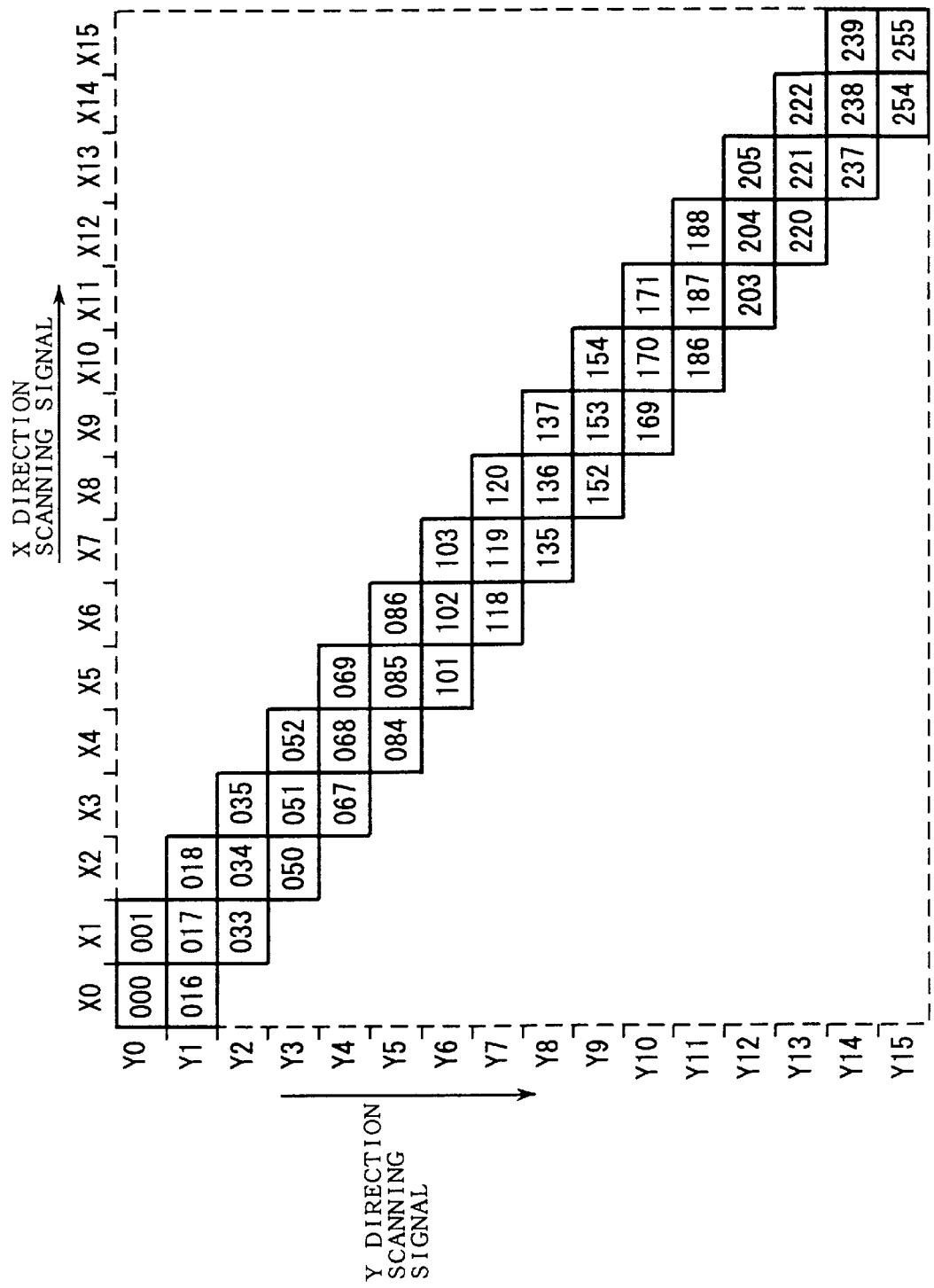
FIG. 26 is an explanatory diagram of a light emitting position corresponding to the plane aerial image in FIG. 25.

The switching operation using a plane aerial image 106 appearing near the opening 102 by the optical system in the casing 96 by the image display of the 2-dimensional image generator 104 by the controller in FIG. 22 will now be explained hereinbelow. It is now assumed that, for example, a 2-dimensional image in the oblique direction as shown in FIG. 24 is displayed by the 2-dimensional image generator 104. The plane aerial image 106 as shown in FIG. 25 is allowed to appear as a display image. As a plane aerial image 106, 15 switch portions 140-1 to 140-15 are formed in the oblique direction by setting total four LEDs of two LEDs in the vertical direction and two LEDs in the lateral direction in FIG. 25 to one set. Among the switch portions 140-1 to 140-15 appearing as a plane aerial image 106, for example, when the switch portion 140-1 at the left upper corner is touched by the finger 48, the reflected light due to the finger 48 is received by the photosensitive element 114 provided at the upper corner of the 2-dimensional image generator 104 in FIG. 24. The photodetecting circuit 134 in FIG. 22 receives a photosensing signal of the reflected light by the photosensitive element 114 and generates a photodetection signal E15 by the operation of the finger 48. The photodetection signal E15 from the photodetecting circuit 134 is supplied to the timing discriminating circuit 136, thereby turning on the switch signal corresponding to the four LEDs arranged in a rectangular shape corresponding to the switch portion 140-1 and generates it. FIG. 26 shows numbers indicative of the LEDs in FIG. 24 corresponding to the 15 switch portions 140-1 to 140-15 of the plane aerial image 106 in FIG. 25. It is assumed that the position (X0, Y0) at the left upper corner is set to 000, the number of the LED is increased one by one in the X direction. When the position reaches the right edge, the line is changed in the Y direction by one. Finally, the LED number is set to 255 at the position (X15, Y15) at the right lower corner. The numbers of the elements correspond to light emission position signals D000 to D255 in FIG. 27A.

FIGS. 27A to 27C are time charts for the light emission position signals, photodetection signal E15, and switch signals when two of the four light emitting portions constructing the switch portion 140-1 of the plane aerial image 106 are touched by the finger 48 as shown in FIG. 25. First, the light emission position signals D0 to D255 in FIG. 27A indicate light emitting timings by the X direction scanning signals X0 to X15 and Y direction scanning signals Y0 to Y15 in FIGS. 23C and 23D. The light emission driving operations of the light emission position signals D0 to D255 are repeated for the Y direction scanning period Ty. In this instance, as shown in FIG. 25, it is assumed that the portions corresponding to two numbers 000 and 001 at the left upper corner in FIG. 26 have been touched by the finger 48, the lights emitted in response to the light emission position signals D0 and D1 corresponding to the above numbers are reflected by the finger 48 and the two photodetection signals E15 of FIG. 27B are successively obtained. The timing discriminating circuit 136 obtains the ANDs with the photodetection signal E15 of FIG. 27B by AND gates provided in correspondence to the light emission position signals D0 to D28 of FIG. 27A and generates switch signals S1 to S255. At this time, by the ANDs of the light emission position signals D0 and D1 and photodetection signal E15, the corresponding switch signals S0 and S1 are sequentially generated. Since the photodetection signal E15 by the reflected light from the finger 48 is not obtained at the other timings, the switch signals S2 to S255 are not generated. When an arbitrary position of the plane aerial image 106 in FIG. 25 is touched by the finger 48 as mentioned above, the switch signal corresponding to such a position is generated. In this instance, when a boundary portion between the switch portions 140-1 and 140-2 in FIG. 25 is touched by the finger, the switch signals of the same number corresponding to each of the switch portions are generated, so that which portion was touched by the finger cannot be discriminated. In such a case, on the personal computer side, it is sufficient to judge as an erroneous switch input and to instruct to input again by using the plane aerial image by displaying an error by the 2-dimensional image generator 104. When the switch portion is touched by the finger 48, if a display color of the switch portion 140-1 is changed when a normal switch signal is obtained, whether the switching operation has correctly been performed or not can be known. When it is erroneously operated, the operation can be urged to be again executed. In a manner similar to the controller in the first embodiment shown in FIG. 7, it is also possible to generate an operation sound by using a speaker. By changing the operation sound, the erroneous operation can be fed back. Further, as a 2-dimensional image generator in FIG. 21, the number of elements is further expanded to (640×480) LEDs and a plane aerial image having a resolution which is equivalent to that of a CRT display can be also allowed to appear.

[Input/output of plane aerial image using 1-dimensional image generator]

Figure 28:
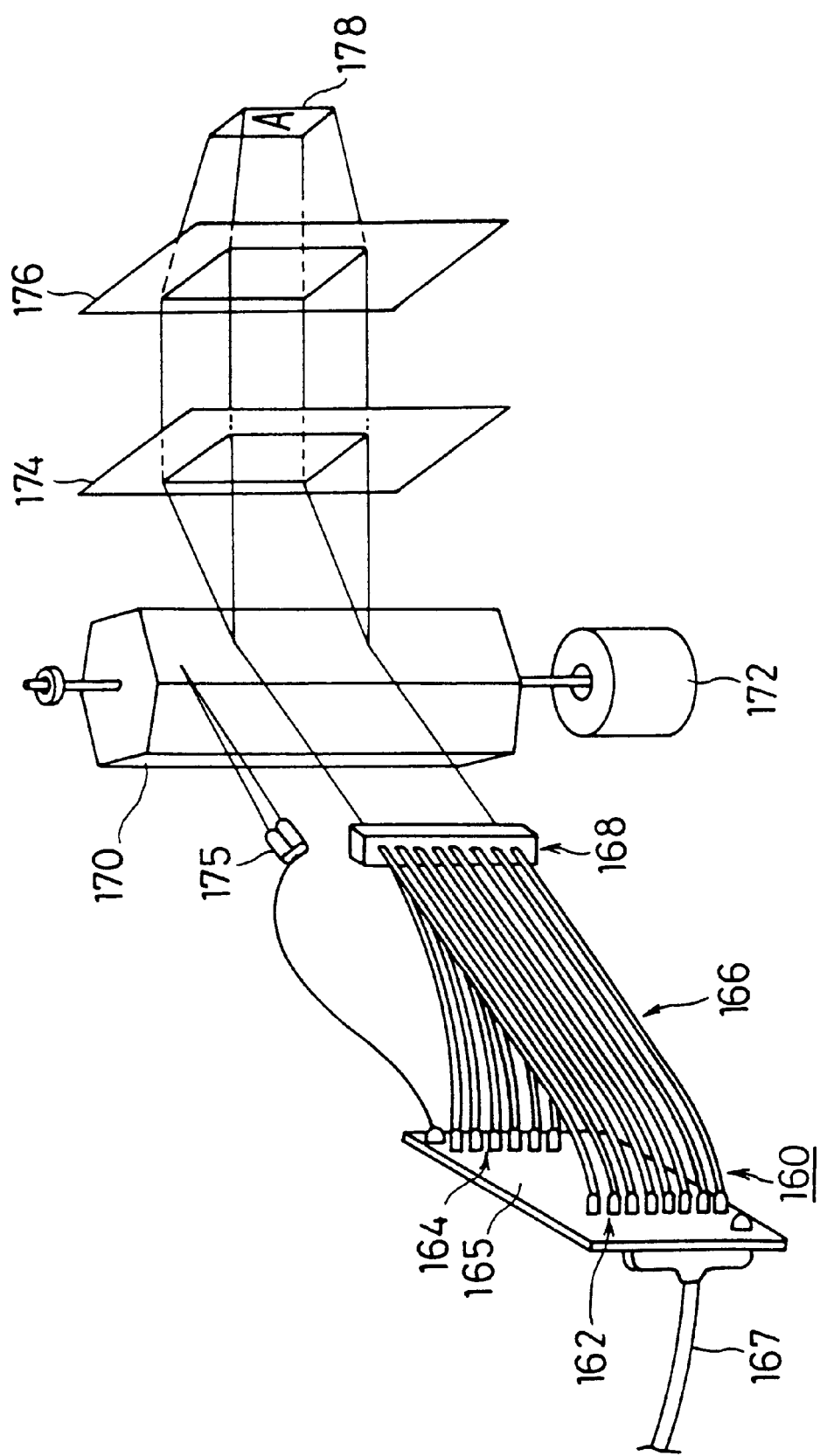
FIG. 28 is an explanatory diagram of the eighth embodiment of the invention using a one-dimensional image generator.

FIG. 28 shows the eighth embodiment of the invention characterized in that a plane aerial image is allowed to appear by using a light emitting/receiving unit in which a plurality of light emitting elements and a plurality of photosensitive elements are one-dimensionally arranged and the inputting and outputting operations are performed. In a light emitting/receiving unit 160, a light emitting element group 162 and a photosensitive element group 164 are arranged in a line on a board 165, respectively. The number of light emitting elements 162 and the number of photosensitive elements 164 which are used are set to, for example, 16 elements, respectively. The elements of the light emitting element group 162 arranged on the unit board 165 are connected to a light emitting/receiving array unit 168 by optical fibers 166. At the same time, the photosensitive elements of the photosensitive element group 164 are also connected to the light emitting/receiving array unit 168 by the optical fibers 166.

Figure 29:
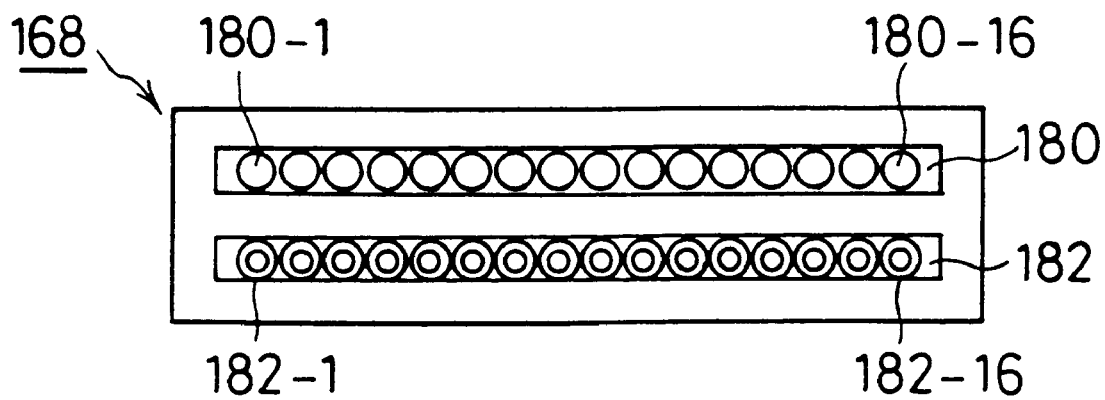
FIG. 29 is an explanatory diagram of a light emitting/receiving unit in FIG. 28.

FIG. 29 shows a light emitting/receiving surface on the light emitting/receiving side of the light emitting/receiving array unit 168. On the light emitting/receiving surface of the light emitting/receiving array unit 168, there is arranged a light emitting array 180 having light emitting units 180-1 to 180-16 in which edge portions of the optical fibers 166 are arranged in a line in the lateral direction. In parallel with the light emitting array 180, a light receiving array 182 in which light receiving units 182-1 to 182-16 of the optical fibers 166 are arranged in a line in the lateral direction is similarly arranged. By optically connecting the light emitting element group 162 and photosensitive element group 164 to such a light emitting/receiving array unit 168 through the optical fibers 166, the light emission of the 1-dimensional image for the optical system constructing a plane aerial image forming unit and the detection of the position of a 1-dimensional photosensing signal when the plane aerial image is touched by the finger can be performed.

When referring to FIG. 28 again, subsequent to the light emitting/receiving array unit 168, a polygon mirror 170 known as a polygon rotational mirror is provided. The polygon mirror 170 functions as a deflecting unit and is rotated at a predetermined speed by a motor 172. The polygon mirror 170 deflects and scans a line-shaped 1-dimensional image emitted by the light emitting/receiving array unit 168 by the rotation and allows the light to enter a Fresnel convex lens 174 as a 2-dimensional image. The Fresnel convex lens 174 converts the 2-dimensional image deflected by the rotation of the polygon mirror 170, in detail, the sequential scan image of the 1-dimensional image into the parallel light. The parallel light is converged by a Fresnel convex lens 176 arranged at a position away from the lens 174 by a predetermined distance, thereby allowing a plane aerial image 178 to appear near the focal position. In this instance, in order to display the plane aerial image 178 by deflecting the 1-dimensional image by the rotation of the polygon mirror 170 without making the user feel a flickering, it is sufficient to perform a scan display of one picture plane for a time which is equal to or shorter than 1/60 second. For this purpose, in case of using, for example, a hexahedral rotational mirror as a polygon mirror 170 as shown in the diagram, a necessary rotational speed N is obtained as follows.

$$N=60 \text{ seconds} \times [1/(\tfrac{1}{60})\text{seconds} \times \text{hexahedral mirror}] = 600 \text{ rpm}$$

The mirror rotational speed N is constant irrespective of a display resolution which is decided by the number of dots in the line direction in the light emitting/receiving array unit 168. When the user wants to reduce the rotational speed of the polygon mirror 170, it is sufficient to increase the number of mirror surfaces. For example, when using an octahedral rotational mirror, it is sufficient to set N to 450 rpm.

Figure 30:
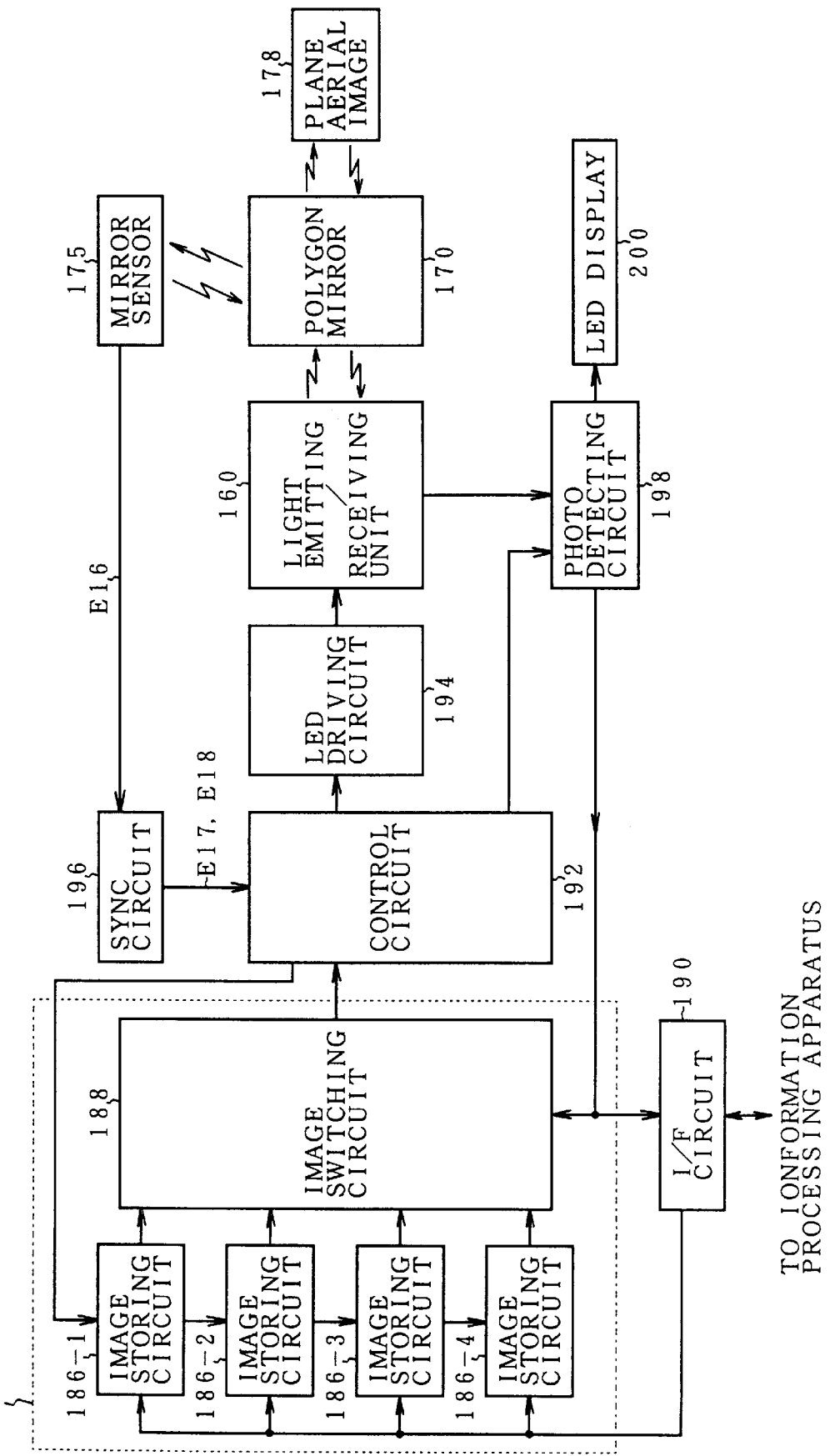
FIG. 30 is a circuit block diagram of a controller which is used in FIG. 28.

FIG. 30 is a circuit block diagram of a controller which is used in FIG. 28. The controller has an image generating unit 184. The image generating unit 184 has four image storing circuits 186-1 to 186-4 and can select an arbitrary stored image by an input image switching circuit 188. As image storing circuits 186-1 to 186-4, image matrix circuits by the XY wirings can be used or image buffer memories can be also used. A control circuit 192 is provided subsequent to the image generating unit 184 and performs the whole control. An LED driving circuit 194 is provided for the control circuit 192 and drives the light emitting element group provided for the light emitting/receiving unit 160 so as to emit lights. A sync circuit 196 is provided for the control circuit 192. A mirror signal E16 from a mirror sensor 175 arranged near the polygon mirror 170 in FIG. 28 is supplied to the sync circuit 196. The sync circuit 196 supplies a mirror surface sync signal E17 indicative of each mirror surface and a sync clock E18 to drive the group of 16 light emitting elements arranged in the light emitting/receiving unit 160 to the control circuit 192 synchronously with the rotation of the polygon mirror 170. A photodetecting circuit 198 for discriminating a position when the plane aerial image 178 is touched by the finger by receiving the photosensing signals from the photosensitive element group is provided for the light emitting/receiving unit 160. The photodetecting circuit 198 can drive an LED display 200 in order to present a sense of the switching operation when the plane aerial image 178 is operated. An interface circuit 190 is connected to an external information processing apparatus such as a personal computer or the like and performs a switching of the image input to the image generating unit 184 and a transfer of the switch signal based on the photodetection signal from the photodetecting circuit 198.

Figure 31:
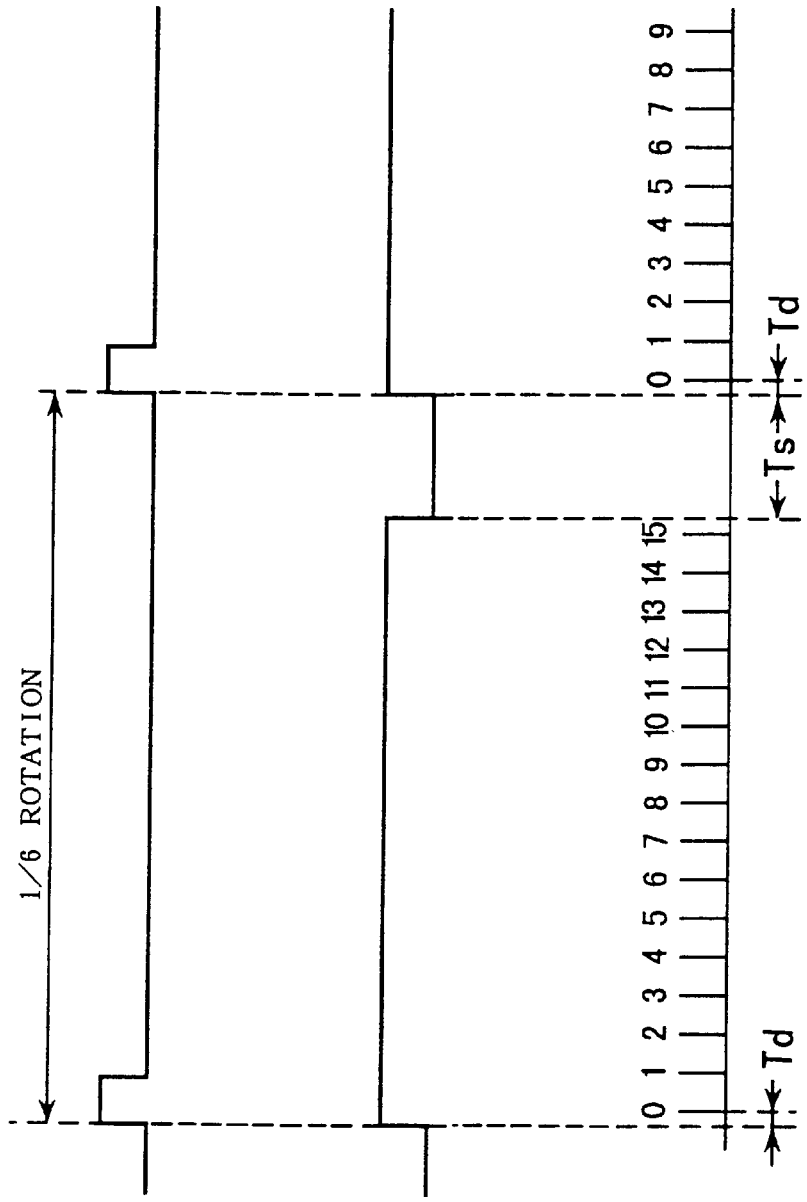
FIGS. 31A to 31C are time charts for the displaying operation of a plane aerial image by the controller in FIG. 28.

The display operation of the plane aerial image according to the eighth embodiment in FIG. 28 by the controller in FIG. 30 will now be explained. When an enable signal to permit an input from the personal computer provided in the outside is received through the interface circuit 190, the input image switching circuit 188 of the image generating unit 184 is made operative, reads out a 2-dimensional image in any one of the image storing circuits 186-1 to 186-4 in which the designated images have been stored, and transmits to the control circuit 192. As image information to be sent to the control circuit 192, the 2-dimensional image is read out on a 16-dot unit basis in, for example, the Y direction (vertical direction) and is transmitted to the control circuit 192. The mirror surface sync signal E16 as shown in FIG. 31A indicative of the ⅙ rotation of the polygon mirror 170 as a hexahedral rotational mirror has been inputted to the control circuit 192 from the mirror sensor 175 provided for the polygon mirror 170. Therefore, the sync circuit 196 generates the sync signal E17 of FIG. 31B to perform the light emission driving of one line synchronously with the mirror surface sync signal E16. The sync signal E17 is generated synchronously with the leading edge of the mirror signal E16 and is finished in the predetermined time Ts in response to the leading edge of the next mirror signal E16. When the sync signal E17 is generated, the sync clock E18 of FIG. 31C to drive the 16 LEDs arranged in a line in the light emitting/receiving unit 160 is generated in association with the sync signal E17. The first sync clock E18 is delayed by a predetermined delay time Td from the leading edge of the sync signal E17. This is because since the mirror signal E16 is generated in the surface boundary portion of the polygon mirror, the incidence of the irradiation light to the portion of the corner of the polygon mirror is avoided by delaying the signal by the delay time Td from the signal E16. When the delay time Td elapses, as shown by the numbers 0 to 16, the sync clock E18 to read out the pixels of 16 lines in the Y direction on a line unit basis per image of one picture plane and to perform the light emission driving is generated. By receiving the sync clock E18, the control circuit 192 reads out the image information of one picture plane in the proper image storing circuit selected by the input image switching circuit 188 on a line unit basis in the Y axial direction, supplies to the LED driving circuit 194 in parallel, and drives the 16 LEDs of one line provided for the light emitting/receiving unit 160 so as to emit the lights. By repeating the above processes the number of times corresponding to one picture plane, namely, 16 lines in the Y direction, the polygon mirror 170 is rotated by ⅙ rotation for such a period of time, the line images which enter the Fresnel convex lens 174 are sequentially deflected and scanned due to an inclination of the mirror surface in association with the rotation of the mirror 170, and the plane aerial image 178 is allowed to appear at the focal position of the Fresnel convex lens 176 by inputting the 2-dimensional image of one picture plane for a period of time of ⅙ rotating time. The above processes are repeated six times for a period of time during which the polygon mirror 170 is rotated once. On the other hand, when the plane aerial image 178 appearing by the rotation scan of the polygon mirror 170 as shown in FIG. 28 is touched by the finger in order to input a switch, the switch signal corresponding to the 2-dimensional image at the position touched by the finger is detected by the photodetecting circuit 198 and is transmitted to the personal computer side through the interface circuit 190. The photodetecting circuit 198 has recognized the present position of the light emitting line in the 2-dimensional image by receiving the sync clock E18 of FIG. 31C from the control circuit 192. The circuit 198 discriminates the position of the photosensitive element on the line position from the photosensing signal from any one of the 16 photosensitive elements in the photosensitive element group 164 of the light emitting/receiving unit 160 by the reflected light obtained by touching such a position by the finger and generates the switch signal indicative of the operation of a specific pixel in the 2-dimensional image to the personal computer side through the interface circuit 190.

Figure 32:
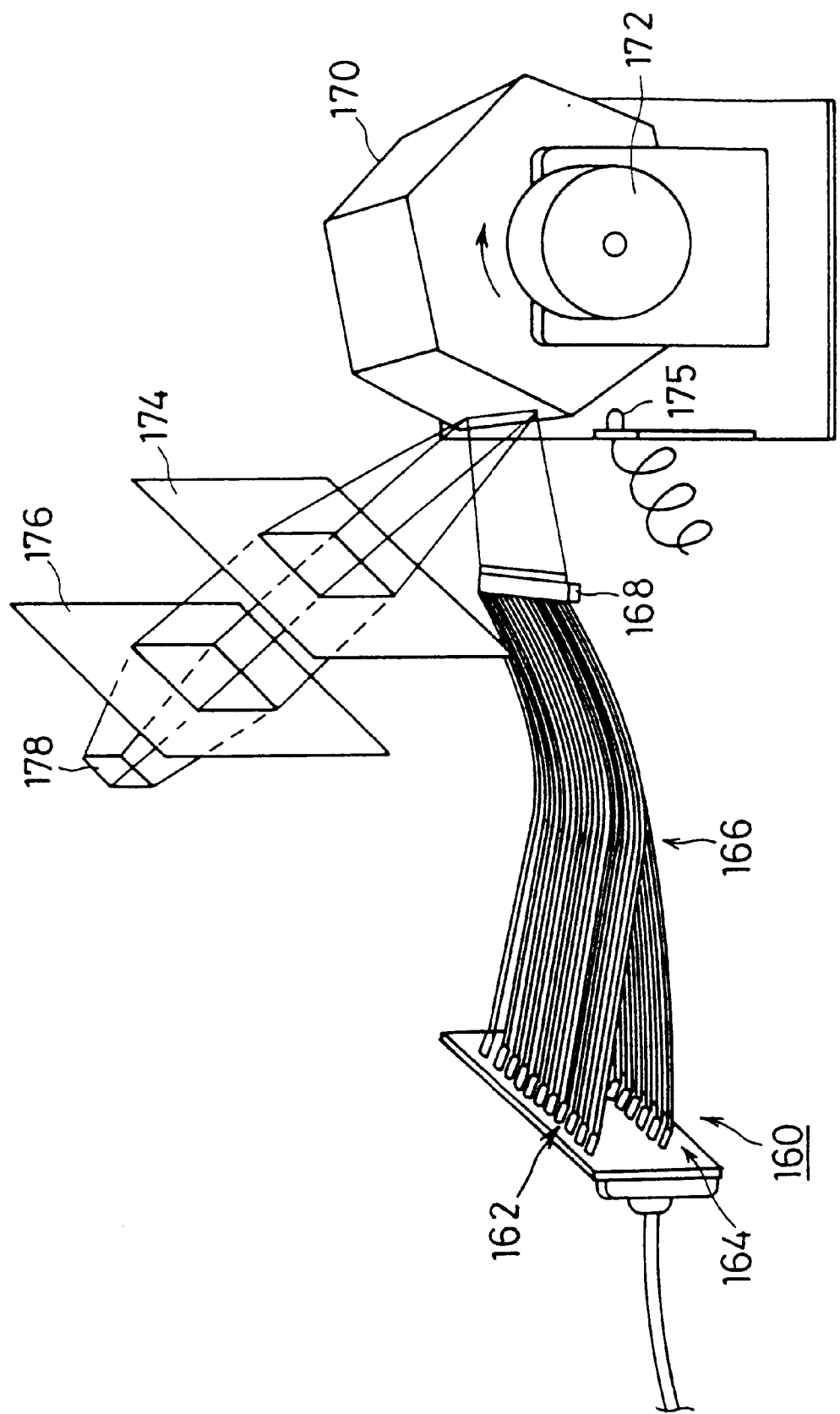
FIG. 32 is an explanatory diagram of a modification of the embodiment in FIG. 28.

FIG. 32 shows a modification of the eighth embodiment of FIG. 28 and is characterized in that the Fresnel convex lenses 174 and 176 are arranged on the same side as that of the light emitting/receiving unit 160, thereby allowing the plane aerial image 178 to appear. In this manner, by allowing the plane aerial image 178 to appear by returning the scanning light by the polygon mirror 170, a compact apparatus can be constructed as a whole.

Figure 33:
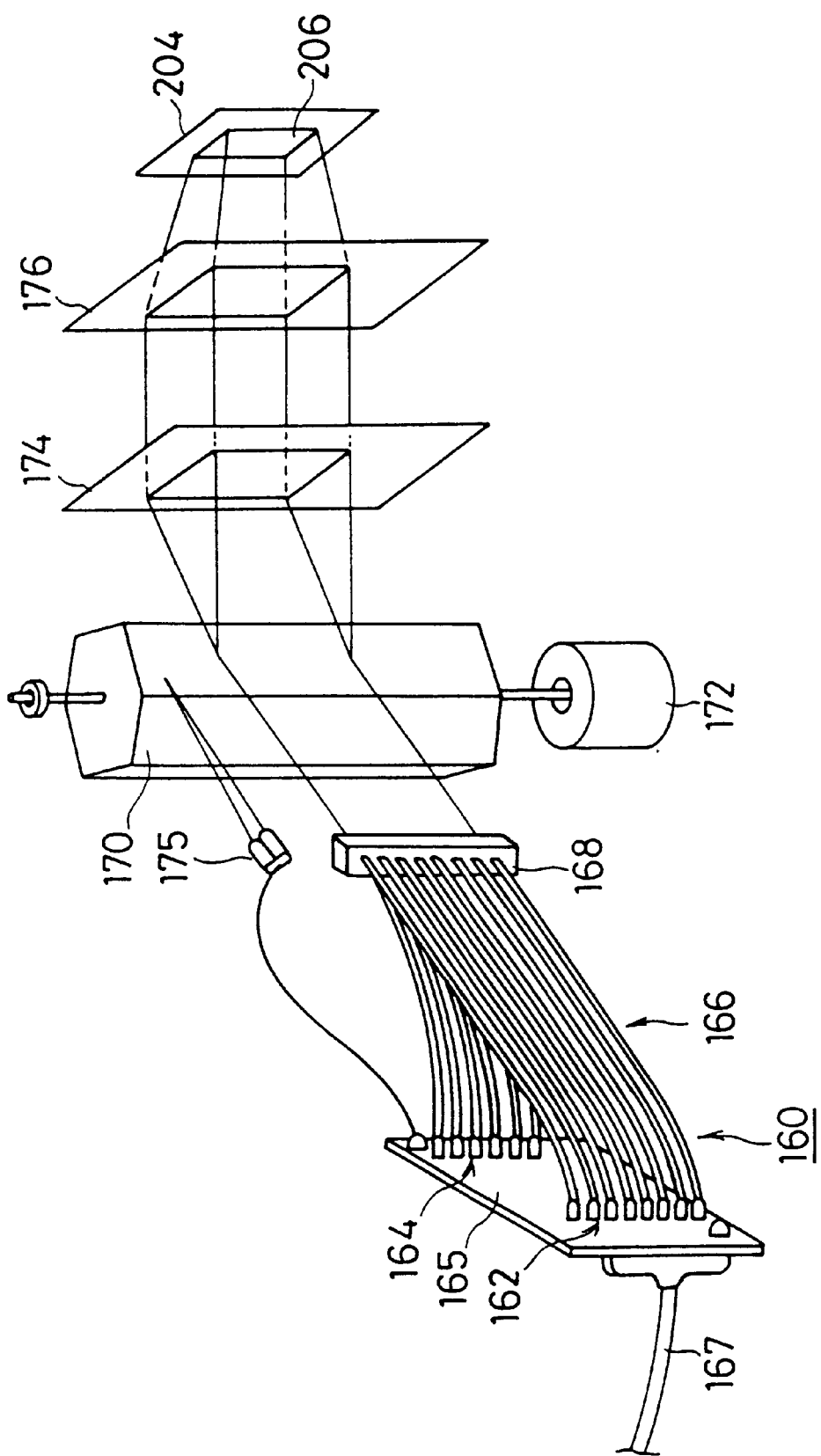
FIG. 33 is an explanatory diagram of the ninth embodiment of the invention in which an image input is executed.

FIG. 33 shows the ninth embodiment of the invention characterized in that a reading apparatus of images is realized by using the eighth embodiment of FIG. 28. Although the construction in FIG. 33 is substantially the same as that in FIG. 28, an image forming position of the plane aerial image as a focal position of the Fresnel convex lens 176 is set to an input scanning surface 206, so that a proper input image 204 such as photograph, diagram, sentence, or the like can be arranged at the position of the input scanning surface 206.

Figure 34:
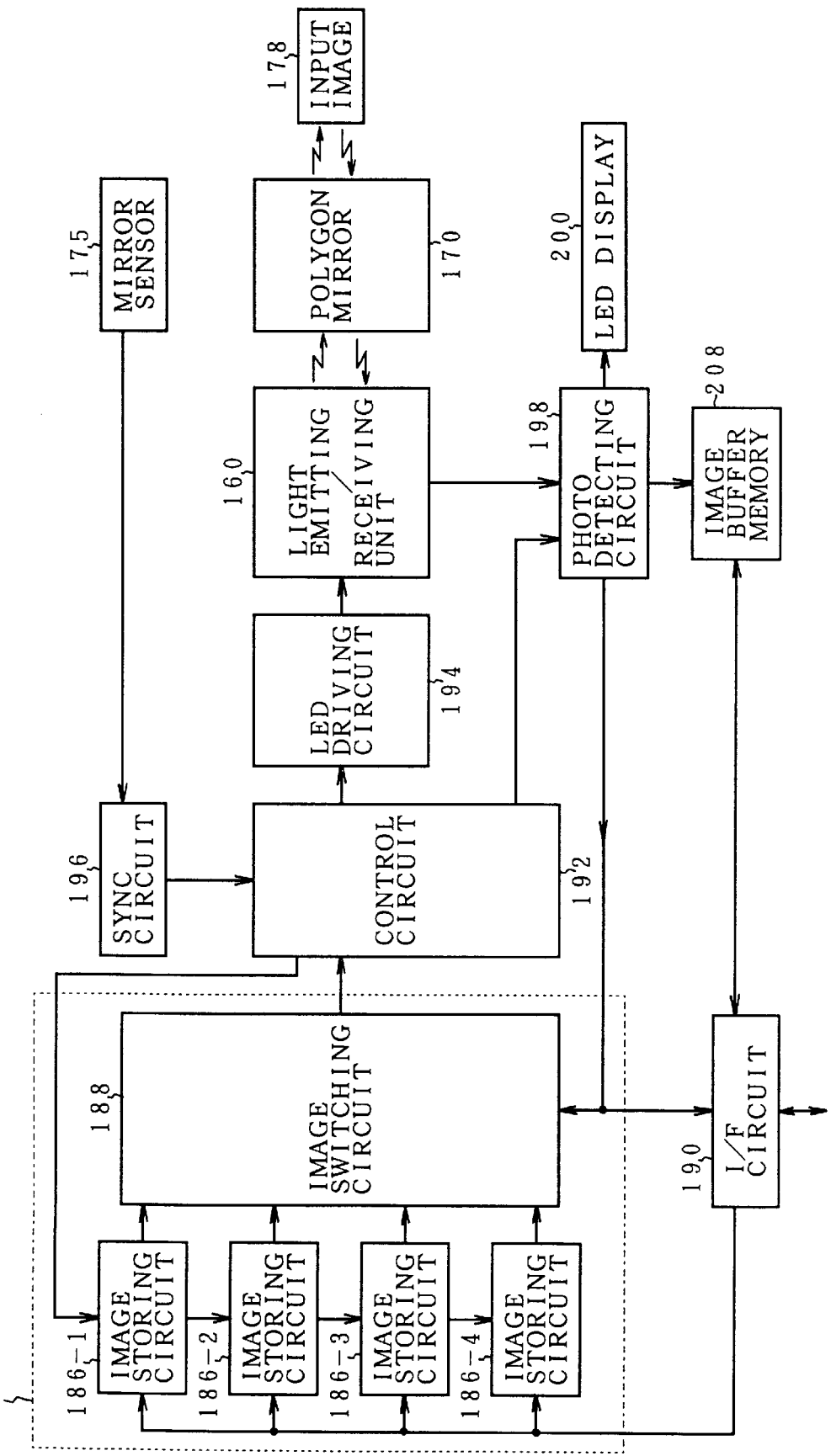
FIG. 34 is a circuit block diagram of a controller which is used in FIG. 33.

FIG. 34 is a circuit block diagram of a controller which is used for an image reading operation in FIG. 33. Although the construction of this controller is fundamentally the same as that of the controller in FIG. 30, an image buffer memory 208 for storing the read image data is newly provided. In order to read the input image 204 arranged on the input scanning surface 206 in FIG. 33, an illumination is needed. In order to realize a reading light source in any one of the image storing circuits 186-1 to 186-4 of the image generating unit 184 provided for the controller in FIG. 34, for example, the image storing circuit 186-1, uniform image data for emitting a light having a predetermined constant orbit has previously been stored. The control circuit 192 drives the light emitting element group in the light emitting/receiving unit 160 so as to emit lights on a line unit basis synchronously with the rotation of the polygon mirror 170 by the image sensor 175 by using the uniform light emission image data in the image storing circuit 186-1 which is used for the illumination of this image input and scans a light emission line for reading onto the input scanning surface 206 in FIG. 33. In association with the scan of the light emission line for reading to the input scanning surface 206, the reflection signal according to the contents of the input image 204 enters the photosensitive element group 164 of the light emitting/receiving unit 160 on a line unit basis and is received by the photodetecting circuit 198. After a waveform of the received signal was shaped, the resultant signal is normalized to a predetermined gradation level. The image data read out on a line unit basis is stored into the image buffer memory 208. As a rotational speed of the polygon mirror 170 when reading images, a high-speed rotation as in case of displaying the plane aerial image is not needed. Since one picture plane can be read by the ⅙ rotation of the polygon mirror 170, when the input image 204 is a still image, it is sufficient to rotate the polygon mirror 170 at a fairly slow rotational speed. As an input image 204, when the user wants to input a motion picture image such as a television image or the like which changes at a high speed, if the polygon mirror 170 is rotated synchronously with an image switching speed of the television image, for example, at a rotational speed which is equivalent to that in case of allowing a plane aerial image to appear by display driving, a motion picture such as a television image or the like can be also read out in a real-time manner.

Figure 35:
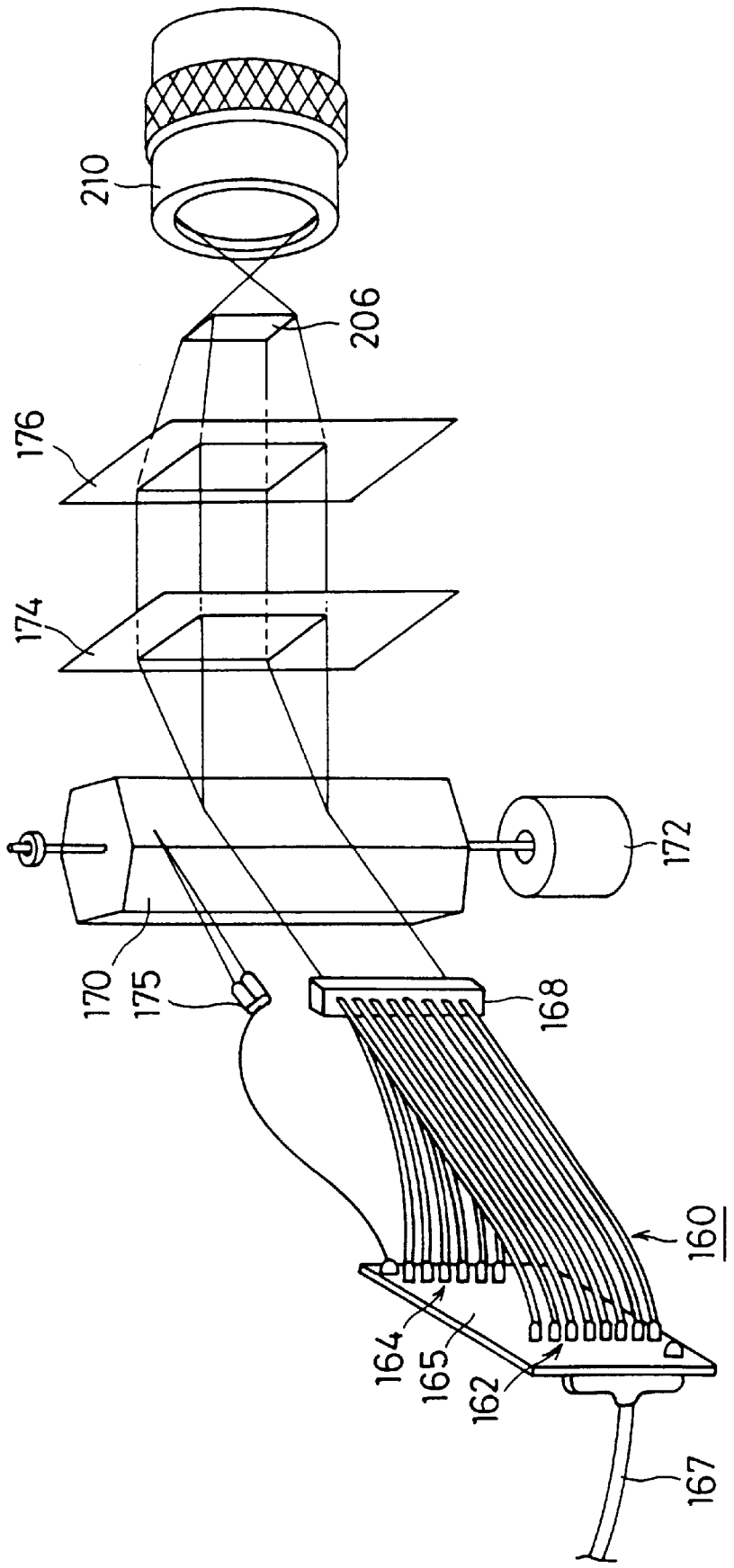
FIG. 35 is an explanatory diagram of a modification of the embodiment in FIG. 33.

FIG. 35 shows a modification of the ninth embodiment for reading images in FIG. 33 and is characterized in that an image such as a scenery or the like photographed by a photographing lens unit 210 is formed at a position of the input scanning surface 206 and is read as a 2-dimensional image. Since the reflection of the light from the light emitting/receiving unit 160 is not used in this case, the light emission driving has halted. By setting a time to read out one picture plane from the input scanning surface 206 by the photographing lens unit 210 to, for example, ⅟60 second, an input of a motion picture image which is equivalent to that by a television camera can be realized. Further, by providing photosensitive element groups 164 of the light emitting/receiving unit 160 for three colors of RGB and arranging color filters of RGB to incident edge portions of RGB of the light emitting/receiving unit 160 which enter the optical fibers 160, a color image on the input scanning surface 206 formed by the photographing lens unit 210 can be also read out.

[Input/output of solid aerial image]

Figure 36:
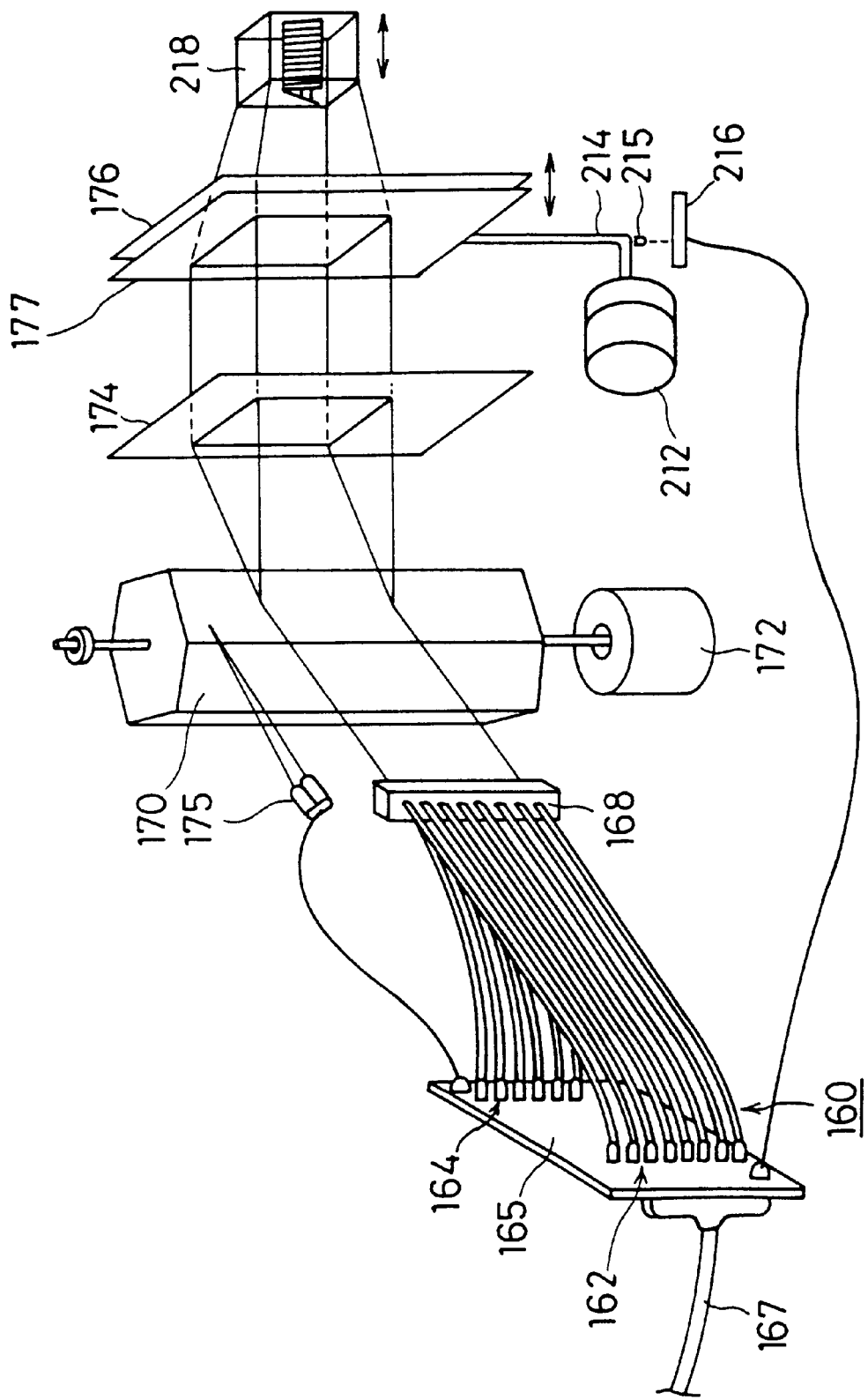
FIG. 36 is an explanatory diagram of the tenth embodiment of the invention for allowing a solid aerial image to appear.

FIG. 36 shows the tenth embodiment of the input/output apparatus according to the invention and is characterized in that image information generated from the information processing apparatus is allowed to appear as a solid image in a space, the position of an object such as a finger or the like which touched the solid image is detected, and position information is inputted to the information processing apparatus. A construction of an apparatus to display a solid aerial image is fundamentally the same as that of the light emitting/receiving unit 160, polygon mirror 170, and Fresnel lenses 174 and 176 of a 1-dimensional arrangement in FIG. 28. In addition to such an apparatus construction, in order to display a solid aerial image, a third convex lens 177 is provided in front of the second convex lens 176 so as to be movable in the optical axial direction. Since the distance from the second convex lens to the image forming surface is determined by the synthesized focal distance of the second and third convex lenses 176 and 177, by changing the distance between those two lenses, the position of the image forming surface can be changed. Namely, when the third convex lens 177 is moved to this side so as to be away from the second convex lens 176 fixedly arranged, the image forming surface approaches the surface of the second convex lens 176. On the contrary, when the third convex lens 177 is made to approach the second convex lens 176, the image forming surface is away from the surface of the second convex lens 176. To display a solid motion picture image as a solid aerial image 218, it is necessary to display and scan one solid picture plane within a time of ⅟60 second.

Figure 37:
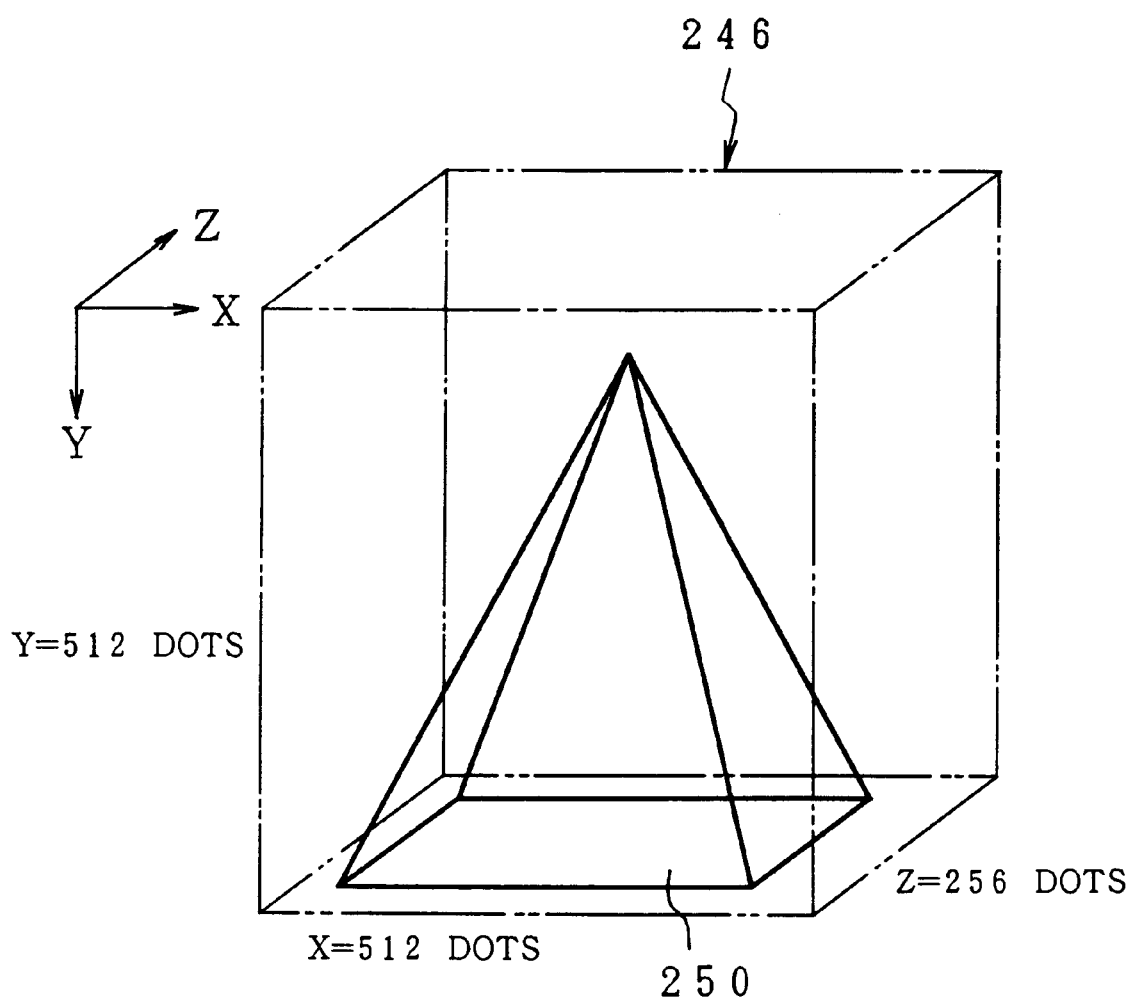
FIG. 37 is an explanatory diagram of the solid aerial image according to FIG. 36.

FIG. 37 shows an example of a display resolution in a solid display space 246 of the solid aerial image 218 in FIG. 36. To clearly display the solid motion picture image, the resolution is set to 512 dots in the X direction (lateral direction), 512 dots in the Y direction (vertical direction), and further, 256 dots in the Z direction (depth direction). Such a display resolution exceeds a resolution of (300 dots in the horizontal direction×350 dots in the vertical direction) in the existing television screen. A clear solid aerial image 250 can be displayed. The rotational speed N of the polygon mirror 170 in FIG. 36 necessary when the number of picture planes in the Z direction (depth direction) to realize such a display resolution is equal to 256 is as follows when, for example, a 32-face rotational mirror is used as a polygon mirror 170.

$$N=60\times[1/\{1/(60\times254 \text{ picture planes})\}\times32\text{-face mirror}]=28800 \text{ rpm}$$

In this case, although the resolution of the solid aerial image is proportional to the number of picture planes in the Z direction serving as a depth direction, it doesn't depend on the number of pixels of one plane image. A display resolution of one plane image relates to a flickering period T of the light emitting element serving as a display surface. For example, when displaying the solid aerial image 250 of (512×512×256 dots) in FIG. 37, if a line display of 512 elements corresponding to 512 dots in the X direction is enabled as a light emitting element group 162 in FIG. 36, the flickering period T of each element is as follows.

$$T=1/(60\times256 \text{ picture planes}\times512 \text{ elements})=127 \text{ nsec.}$$

Actually, now assuming that an interlacing process is executed in a manner similar to that in the television, the flickering period T is extended to 254 nsec. as a double period. The flickering period T=254 nsec. can be set to be slower than about 200 nsec. as a flickering period in the existing NTSC system.

To repetitively reciprocatingly move the third convex lens 177 in the depth direction at 60 Hz in order to display the solid aerial image 218 in FIG. 36, the third convex lens 177 is supported to an electromagnetic actuator 212 through a supporting member 214. To display the solid aerial image 218, it is necessary to display one solid aerial image for a time of ¹⁄₆₀ second. Therefore, the electromagnetic actuator 212 needs a stroke length of a few mm and a tracking speed of 60 Hz. When the electromagnetic actuator 212 is set to a stroke of a few mm and a tracking speed of 60 Hz, those values can be realized by the present technique. However, if such a moving speed can be reduced, a further stable operation can be guaranteed. When the third convex lens 177 is moved in the depth direction at 60 Hz by the electromagnetic actuator 212, the third convex lens 177 reciprocates 60 times per second. Namely, the third convex lens 177 is moved 60 times from the front side to the rear side and is moved 60 times from the rear side to the front side. Therefore, by displaying one solid aerial image with respect to each of the movement from the front side to the rear side and the movement from the rear side to the front side, even if one solid aerial image is displayed in ¹⁄₆₀ second, the moving speed can be reduced to 30 Hz corresponding to ½ of 60 Hz. In case of a value of about 30 Hz, the movement of the third convex lens 177 can be also easily realized even by the present electromagnetic actuator 212. When one solid aerial image is displayed with respect to each of the going movement and the returning movement of the objective lens, it is necessary to reverse the scanning order of the plane images to form the solid aerial image with regard to the going direction and the returning direction.

Figure 38A:
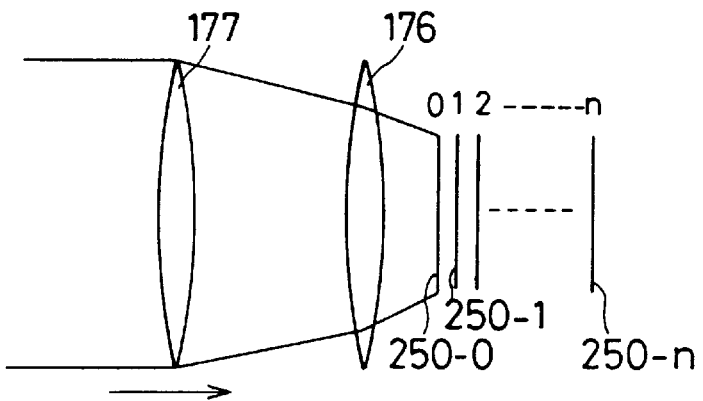
FIGS. 38A and 38B are explanatory diagrams for allowing a solid aerial image to be displayed in each of the going and returning paths in which a moving speed in the depth direction is reduced to the half in FIG. 36.
Figure 38B:
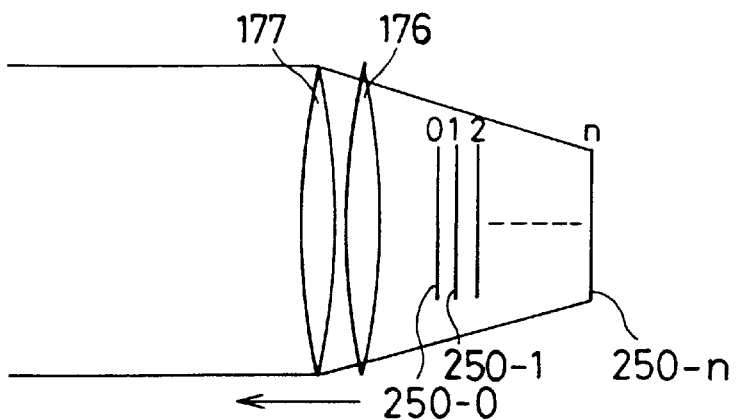

FIGS. 38A and 38B show a state of reversal of the scanning order of the plane image in the going movement and returning movement. FIG. 38A shows the case of moving the third convex lens 177 from the front side to the rear side. In this case, the plane image is displayed and scanned so as to obtain the order of plane aerial images 250-0, 250-1, . . . , and 250-n. FIG. 38B shows the case of the returning movement for moving the third convex lens 177 to the front side on the contrary. In this case, the plane images are displayed and scanned by the opposite order of n, . . . , and 0 so as to obtain the plane aerial images 250-n, . . . , and 250-0.

FIG. 39 shows another embodiment to display a solid aerial image. In the embodiment, a distance L between the first convex lens 174 and polygon mirror 170 is set to be slightly larger than a focal distance F of the first convex lens 174, thereby allowing the light which passed through the first convex lens 174 to become the non-parallel light which is slightly converted instead of the parallel light. Further, a fixed mirror 255 is provided between the first convex lens 174 and the second convex lens 176 arranged so as to be away from the lens 174 by a predetermined distance. The fixed mirror 255 has two mirror surfaces 256 and 262 on the outside at an apex angle $\alpha$=about 45°. The mirror surfaces 256 and 262 are arranged at an angle of about 45° for the optical axis. A movable mirror 257 having two mirror surfaces 258 and 260 on the inside at an apex angle $\beta$=90° is arranged at the position which perpendicularly crosses the optical axis which faces the fixed mirror 255 so as to face the mirror 255. The movable mirror 257 is coupled to a motor 264 through a supporting member 268 via a piston crank mechanism by a piston 265 and a crank 266. When the movable mirror 257 is away from the fixed mirror 255, a whole optical path becomes long, so that the image forming surface to form the solid aerial image 218 approaches the surface of the second convex lens 176. When the movable mirror 257 approaches the fixed mirror 255, on the other hand, the whole optical path decreases, so that the image forming surface is away from the surface of the second convex lens 176. Namely, by the movement of the movable mirror 257, the plane aerial images can be scanned in the depth direction, so that the solid aerial image 218 can be made appear. When the user intends to use the movable mirror 257, as compared with the case of the movement of the third convex lens 177 in FIG. 36, generally, a weight of mirror can be lightened, an inertial load to drive and scan the images in the depth direction can be reduced, and the motor 264 to be used can be miniaturized. When the solid aerial image 218 is displayed, since it is necessary to display one solid aerial image in ¹⁄₆₀ second, 3600 rpm is needed as a rotational speed of the motor 264. As shown in FIGS. 38A and 38B, when one solid aerial image is displayed in each of the going path and the returning path of the plane aerial images, the rotational speed of the motor 264 can be set to the half speed, namely, 1800 rpm.

FIG. 40 is a circuit block of a controller which is used for a display control of the solid aerial image 218 in FIGS. 36 and 39. The controller is constructed by: an image memory 220; an address scanning circuit 222, a write switching circuit 226, an odd-number solid field memory 228; an address scanning circuit 230; an even-number solid field memory 232; an address scanning circuit 234; a scanning direction change-over switch 235; a control circuit 236; a read switching circuit 238; a driving circuit 240; a photo-detecting circuit 242; a photosensitive image buffer memory 244; an operating position discriminating circuit 245; and an interface circuit 224. Solid image information to display a solid aerial image is stored into the image memory 220. The solid image information is, for example, 3-dimensional image information of [(512 dots in the X direction)×(512 dots in the Y direction)×(256 dots in the Z direction)] corresponding to the solid aerial image display space 246 in FIG. 37. The solid image information stored in the image memory 220 is respectively stored into the odd-number solid field memory 228 and even-number solid field memory 232 through the write switching circuit 226 and is alternately read out by the read switching circuit 238 by setting the display of one solid aerial image to one unit. The read-out solid image information is supplied to the driving circuit 240, thereby performing the line light emission of the light emitting/receiving unit 160. Each of the odd-number solid field memory 228 and even-number solid field memory 232 has a memory construction of (X bits×Y words×Z stacks) and has the pixels of the number corresponding to the number of dots in each direction of the solid aerial image in FIG. 37.

The display operation of the solid aerial image will now be described. The mirror surface sync signal E16 from the mirror sensor 175 provided for the polygon mirror 170 in FIG. 36 and a solid sync signal E20 from a solid position sensor 216 provided for the third convex lens 177 which is reciprocatingly moved by the electromagnetic actuator 212 are inputted to the control circuit 236. As a solid position sensor 216, a PSD in which photosensitive elements are arranged in a line or the like is used. The sensor 216 receives the light from the LED 215 attached to the supporting member 214 and can detect the moving position of the third convex lens 177. The control circuit 236 starts the driving of the electromagnetic actuator 212 synchronously with the mirror surface sync signal E16 from the mirror sensor 175 provided for the polygon mirror 170. When the third convex lens 177 reaches, for example, the scan start position of the edge portion on this side by the electromagnetic actuator 212, a sync circuit 237 generates the solid sync signal E20 after the elapse of a predetermined delay time on the basis of a detection signal of the solid position sensor 216. When receiving the solid sync signal E20, the control circuit 236 instructs an access address of the stack Z=0 and the word Y=0 to the address scanning circuit 230 in the odd-number solid field memory 228. The memory access address is hereinafter expressed as (stack−word)=(0−0). Therefore, the data as many as X bits, namely, X=512 bits designated by the access address (0-0) is read out in parallel from the odd-number solid field memory 228 and is supplied to the driving circuit 240 through the read switching circuit 238, thereby simultaneously driving the light emitting element group 162 of 512 dots provided for the light emitting/receiving unit 160 in accordance with the data of each dot at that time. Subsequently, by sequentially reading out the access addresses as (0-1), (0-2), . . . , and (0-511) for the odd-number solid field memory 228, the image data of one plane image is read out for a period of time until the mirror surface sync signal E16 is subsequently obtained, thereby forming one plane aerial image. Subsequently, when the next mirror surface sync signal E16 is inputted by the rotation of the polygon mirror 170, the control circuit 236 reads out the image information on a unit basis of X=512 dots by the access addresses (1-0), (1-1), . . . , and (1-511) as many as the number of word addresses Y=0 to 511 in a next stack address Z1, thereby similarly forming the second plane aerial image. In a manner similar to the above, image information up to the access addresses (255-0), (255-1), . . . , and (255-511) is read out, thereby completing one solid aerial image. When the third convex lens 177 reaches the edge portion in the depth direction, the sync circuit 237 generates the solid sync signal E20 after the elapse of a predetermined delay time on the basis of the detection signal of the solid position sensor 216. When receiving the solid sync signal E20, the control circuit 236 subsequently accesses the even-number solid field memory 232. In this instance, by previously turning on the scanning direction change-over switch 235 provided for the address scanning circuit 234 of the even-number solid field memory 232, the accessing order of the stack addresses is reversed. Therefore, in the even-number solid field memory 232, the image data in the access address (255-0) is first read out and the image data in the access addresses (255-1), . . . , and (255-511) is hereinafter sequentially read out, so that the first plane aerial image is formed. Subsequently, when the mirror surface sync signal E16 is obtained from the sync circuit 237, the control circuit 236 reads out the data in the access addresses (254-0), (254-2), . . . , and (254-511) in the even-number solid field memory 232 and displays. The above processes are repeated up to the access addresses (0-1), (0-2), . . . , and (0-511), thereby completing next one solid aerial image by the returning movement of the third convex lens 177. In a manner similar to the above, the scanning display of each solid aerial image in the going path and the returning path by the accesses of the odd-number solid field memory 228 and even-number solid field memory 232 is repeated at a driving frequency of 30 Hz. When the solid aerial image 218 is touched by the finger for an inputting operation or the like, the position of the solid image touched by the finger is detected by the photodetecting circuit 242. The scanning position (Y, Z) for the driving circuit 240 has been inputted to the photodetecting circuit 242 by the read switching circuit 238. A photosensing signal indicative of the photosensing position of the reflected light when the solid aerial image 218 is touched by the finger is derived from the photosensitive element group 182 provided for the light emitting/receiving unit 160. Therefore, the photodetecting circuit 242 outputs information indicative of the photosensing position of the reflected light in the 3-dimensional space of (X, Y, Z). In the embodiment, the detection signal from the photodetecting circuit 242 is stored into the photosensitive image buffer memory 244 to store the same 3-dimensional image information as that in the image memory 220. The operating position discriminating circuit 245 is provided for the photosensitive image buffer memory 244. The operating position is discriminated from the dots indicative of the reception of the reflected light in the 3-dimensional image information read from the photodetecting circuit 242 synchronously with the display of one solid aerial image 218. The position discrimination information is transferred to the information processing apparatus through the interface circuit 224. Since the solid aerial image displayed by the tenth embodiment of the invention as mentioned above is formed by the scan in the depth direction of the plane aerial images, it is an image such that the outline of the portion which cannot be ordinarily seen because it is a shadow portion can be seen as a see-through image, namely, what is called a phantom image. Therefore, such a solid aerial image is suitable to display a solid image in the field where it is necessary to display a phantom image such as image for a medical use or CAD image. Particularly, in the image for the medical use, it is a present situation that 3-dimensional image information of a human internal organ such as a heart or the like has already been obtained by a CT scanning apparatus or the like. At present, since there is not a proper apparatus for displaying a solid image, unavoidably, plane images are outputted as a number of tomograms or a projection diagram is displayed on a 2-dimensional display apparatus such as a CRT or the like and a pseudo solid image is used. On the other hand, according to the tenth embodiment of the invention, a solid image can be made appear in a space on the basis of the 3-dimensional image information such as a human organ or the like. Moreover, when the aerial solid image is touched by an object such as a finger or the like, the touching position is detected at a high precision and the position information can be inputted to the information processing apparatus. Therefore, for example, a heart or the like displayed as a solid aerial image is simulatively cut out at an arbitrary cross section and two cut solid images can be also simultaneously displayed in a space. Namely, by using the functions of the display of the solid aerial image and the position detection of the tenth embodiment of the invention, a simulation of a surgical operation or the like based on CT solid image information of the actual organ can be performed by using the solid aerial image and a contribution degree for the medical field is extremely high. The invention is not limited to the medical field but the processes based on the display of a solid aerial image and the position detection when the display of the solid aerial image is touched by the finger or the like can be effectively applied with respect to an arbitrary field in which solid image information is treated as in a CAD image.

According to the invention as mentioned above, the image information generated from the existing input key or information processing apparatus is made appear in an empty space and the position information by touching the appearing aerial image by an object such as a finger or the like can be detected at a high precision and can be inputted to the information processing apparatus. The exactly new information inputting and outputting functions can be provided by the clear solid aerial image and its position detection. The aerial image is not limited to the plane image but a solid image can be also made appear in a space. Further, not only a still aerial image but also a motion picture aerial image can be also made appear. The exactly new information inputting and outputting functions in which the output and input are integrated by the aerial image can be provided. Further, by using the function to detect the position of the aerial image of the invention, the application to the image input or the like can be also easily realized.

Although the polygon mirror has been used as a deflecting unit to deflect and scan the light from the 1-dimensional light emitting unit in the embodiments of FIGS. 28, 32, 33, 35, 36, and 39, the deflection and scan can be also executed by using a galvano mirror which is swung, a hologram disk which is rotated, a deformable mirror device (DMD), or the like as a deflecting unit other than the polygon mirror.

What is claimed is:

1. An aerial image inputting/outputting apparatus, comprising:

a visible light generating unit for generating visible lights corresponding to one or a plurality of input operating units, said visible light generating unit having a 1-dimensional image generator in which a plurality of light emitting elements are arranged in a line;

an aerial image forming unit for forming an aerial image of said one or plurality of input operating units into a space on the basis of the visible light generated from said visible light generating unit, said aerial image forming unit having a deflecting unit for deflecting and scanning the visible light from said 1-dimensional image generator in a direction perpendicular to the line, and a solid aerial image forming unit for forming a plane aerial image by inputting a 2-dimensional image produced by the deflection scan of said deflecting unit and for forming a solid aerial image by reciprocatingly moving the position of said plane aerial image within a predetermined range in an optical axial direction;

a photodetecting unit for detecting an operation of the aerial image formed in the space by said aerial image forming unit from a reflected light, said photodetecting unit having a 1-dimensional photosensitive unit in which a plurality of photosensitive elements are arranged in parallel to the line of the light emitting elements of said 1-dimensional image generator; and a controller for allowing the visible light corresponding to said input operating unit to be selectively emitted by a driving of said visible light generating unit, allowing said aerial image forming unit to form said aerial image, and allowing a position detection signal to be outputted to an outside when the operation of said aerial image by said photodetecting unit is detected, said controller further allowing said 1-dimensional generator to selectively emit the light in accordance with a 3-dimensional image input of a character or a figure synchronously with the deflection scan of said deflecting unit, thereby allowing said aerial image forming unit to form a solid aerial image.

2. An apparatus according to claim 1, wherein said aerial image forming unit has:

a first parabola mirror in which the inside having an opening serving as an aerial image forming space in a head apex portion is set to a parabola mirror surface; and a second parabola mirror in which a parabola mirror surface is formed on the inside and said visible light generating unit is arranged in a bottom portion of said parabola mirror surface and which is arranged so as to face said first parabola mirror, and wherein said aerial image forming unit forms the aerial image of said input operating unit into a space of said opening by said two parabola mirror surfaces which face each other.

3. An apparatus according to claim 1, wherein said aerial image forming unit has a rotational ellipsoidal mirror a part of which is cut out and opened, arranges said visible light generating unit at one focal position of said rotational ellipsoidal mirror, and forms the aerial image of said input operating unit at another focal position on the opening side.

4. An apparatus according to claim 3, wherein said rotational ellipsoidal mirror has a mirror surface obtained by rotating an ellipse at a major axis and cutting out at a surface in a minor axial direction.

5. An apparatus according to claim 3, wherein said rotational ellipsoidal mirror has a mirror surface obtained by rotating an ellipse at a major axis and cutting out at the surface in the major axial direction.

6. An apparatus according to claim 4 or 5, wherein in said rotational ellipsoidal mirror, said opening is covered by a transparent cover.

7. An apparatus according to claim 4 or 5, wherein in said rotational ellipsoidal mirror, said opening is covered by a transparent cover and a part of said transparent cover is set to be opaque so that the internal visible light generating unit is not directly seen from said opening.

8. An apparatus according to claim 1, wherein said aerial image forming unit has:

a parabola mirror in which an inside is set to a parabola mirror surface and said visible light generating unit is arranged at a focal position; and a convex lens arranged on the opening side of said parabola mirror so as to be away therefrom by a predetermined distance, and wherein said aerial image forming unit forms the aerial image of said input operating unit into a space at a focal position of said convex lens.

9. An apparatus according to claim 8, wherein in said aerial image forming unit, a plane mirror for deflecting an optical axial direction to an arbitrary direction is arranged between said parabola mirror and said convex lens.

10. An apparatus according to claim 1, wherein said aerial image forming unit has:

a first convex lens in which said visible light generating unit is arranged at the focal position or near said focal position; and a second convex lens arranged subsequent to said first convex lens so as to be away from said first convex lens by a predetermined distance, and wherein said aerial image forming unit forms the aerial image of said input operating unit into a space at a focal position of said second convex lens.

11. An apparatus according to claim 1, wherein said visible light generating unit is constructed by one or a plurality of light emitting keys having light emitting elements and allows said aerial image forming unit to form aerial images of said light emitting keys, and said photodetecting unit is a photosensitive element which is provided in said light emitting unit and which receives a reflected light by the operation of said aerial image.

12. An apparatus according to claim 11, wherein said light emitting key is attached with a key top made of a transparent material having a display such as numeral, symbol, or the like in a head apex portion.

13. An apparatus according to claim 11, wherein said controller has:

a drive scanning circuit for sequentially driving and scanning said plurality of light emitting keys of said visible light generating unit in accordance with a predetermined timing; and a discriminating circuit for discriminating a position of the light emitting element corresponding to the operation of said aerial image on the basis of each driving timing of said plurality of light emitting elements by said drive scanning circuit and a photodetection signal by the photosensitive element of said photodetecting unit and for outputting a switch signal.

14. An apparatus according to claim 1, wherein said visible light generating unit has a 2-dimensional image generator in which a plurality of light emitting elements are arranged in vertical and horizontal directions, said photodetecting unit has one or a plurality of photosensitive elements which are arranged near the light emitting surface of said 2-dimensional image generator and which receive the reflected light by the operation of said aerial image, and said controller allows said aerial image forming unit to form a plane aerial image by driving and scanning the light emitting elements of said 2-dimensional image generator according to an image input of a character, a figure, or the like.

15. Apparatus according to claim 14, wherein said controller has:

an image storing circuit in which image information which is generated by said 2-dimensional image generator has been stored;

a drive scanning circuit for sequentially driving and scanning said plurality of light emitting elements of said 2-dimensional image generator in accordance with a predetermined timing; and a discriminating circuit for discriminating the position of the light emitting element corresponding to the operation of said aerial image on the basis of each driving timing of said plurality of light emitting elements by said drive scanning circuit and the photodetection signal by said photodetecting unit and for outputting a position detection signal.

16. An apparatus according to claim 15, wherein said image storing circuit is a fixed 2-dimensional matrix circuit in which the image information has fixedly been stored in dependence on the presence or absence of a cross connection of matrix wirings or an image memory in/from which the image information can be freely written and read out.

17. An apparatus according to claim 1, wherein:

said visible light generating unit has a 1-dimensional image generator in which a plurality of light emitting elements are arranged in a line;

said aerial image forming unit has a deflecting unit for deflecting and scanning the visible light from said 1-dimensional image generator in the direction perpendicular to the line and an aerial image optical system for forming a plane aerial image by inputting a 2-dimensional image by the deflection scan of said deflecting unit;

said photodetecting unit has a 1-dimensional photosensitive unit in which a plurality of photosensitive elements are arranged in the same line as that of the light emitting elements of said 1-dimensional image generator; and said controller allows said 1-dimensional image generator to selectively emit the light in accordance with an image input of a character, a figure, or the like synchronously with the deflection scan of said deflecting unit, thereby allowing said aerial image forming unit to from a plane aerial image.

18. An apparatus according to claim 17, wherein said controller has:

an image storing circuit in which image information which is generated by said 1-dimensional image generator has been stored;

a drive scanning circuit for allowing the plurality of light emitting elements of said 1-dimensional image generator to selectively emit the light in accordance with said image information synchronously with the deflection scan of said deflecting unit; and a discriminating circuit for discriminating the image position corresponding to the operation of said aerial image on the basis of each driving timing of the plurality of light emitting elements by said drive scanning circuit and the photodetection signal by said photodetecting unit and for outputting a position detection signal.

19. An apparatus according to claim 17, wherein said photodetecting unit reads out the 2-dimensional image arranged at a forming position of said plane aerial image by the detection of the reflected light.

20. An apparatus according to claim 19, wherein when the reflected light from the 2-dimensional image is detected and read by said photodetecting unit, said controller drives all of the light emitting elements of said 1-dimensional image generator so as to uniformly emit the lights at a predetermined luminance.

21. An apparatus according to claim 1, wherein said controller has:

an image storing circuit in which the 3-dimensional image information which is generated by said 1-dimensional image generator has been stored;

a first drive scanning circuit for allowing the plurality of light emitting elements of said 1-dimensional image generator to selectively emit the light synchronously with the deflection scan of said deflecting unit in accordance with 2-dimensional image information which was converted from said 3-dimensional image information and divided in a depth direction;

a second drive scanning circuit for scanning said plane aerial image in the depth direction by the scan of said solid aerial image forming unit in accordance with each position of the 2-dimensional image in the depth direction converted from said 3-dimensional image; and a discriminating circuit for discriminating the image position corresponding to the operation of said solid aerial image on the basis of each driving timing of the plurality of light emitting elements by said first and second drive scanning circuits, the position in the depth direction, and the photodetection signal by said photodetecting unit and for outputting a position detection signal.

22. An apparatus according to claim 1, wherein said solid aerial image forming unit has:

a first convex lens for inputting the 2-dimensional scanning image by said deflecting unit and converting into a parallel light beam;

a second convex lens fixedly arranged at a position away from said first convex lens by a predetermined distance;

a third convex lens, arranged in front of said second convex lens so as to be movable in the optical axial direction, for forming the plane aerial image at a position of a focal distance by a synthesis with said second convex lens; and an actuator for reciprocatingly moving said third convex lens while moving step by step by a micro distance at a time within a predetermined range in the optical axial direction, thereby changing a focal distance where said plane aerial image by the synthesis with said second convex lens is formed.

23. An apparatus according to claim 21, wherein said solid aerial image forming unit has:

a first convex lens for inputting the 2-dimensional scanning image from said deflecting unit while setting a position in front of a deflecting point of said deflecting unit to a focal position and for converting into a non-parallel light beam which is slightly converged in accordance with an optical path length;

a second convex lens fixedly arranged at a predetermined position for said first convex lens;

a reflecting mirror arranged between said first and second convex lenses so as to be movable in a direction which changes the optical path length; and an actuator for reciprocatingly moving said reflecting mirror while moving step by step by a micro distance at a time within a range which changes a predetermined optical path length.

24. An apparatus according to claim 22, wherein said convex lenses are Fresnel lenses whose refraction angles of the light differ in a radial direction directing from a center toward an outside.

25. An apparatus according to claim 1, wherein the light emitting elements which are used in said visible light generating unit have a construction of three primary colors of red, blue, and green, thereby forming a color aerial image.

26. An aerial image input/output method comprising:

a visible light generating step of generating visible lights corresponding to one or a plurality of input operating units, wherein a plurality of light emitting elements which are 1-dimensionally arranged are driven to selectively emit light on the basis of each of 2-dimensional images obtained by dividing a 3-dimensional image in a depth direction;

an aerial image forming step of forming an aerial image of said input operating unit into a space on the basis of the selectively emitted light, wherein the selectively emitted visible light is deflected and scanned in the direction perpendicular to a line direction and is converted into a 2-dimensional image, and after that, a plane aerial image is formed, such that a solid aerial image is formed by reciprocatingly moving the position of said plane aerial image within a predetermined range in an optical axial direction; and a photodetecting step of detecting an operation of the aerial image formed in the space in said aerial image forming step from a reflected light and outputting a position detection signal.

27. A method according to claim 26, wherein:

in said visible light generating step, the visible light of a 2-dimensional image such as character, figure, or the like is emitted by sequentially scanning a plurality of light emitting elements which are 2-dimensionally arranged; and in said aerial image forming step, a plane aerial image of said 2-dimensional image is formed by inputting the visible light by sequentially scanning said plurality of light emitting elements.

28. A method according to claim 26, wherein:

in said visible light generating step, the plurality of light emitting elements which are 1-dimensionally arranged are driven so as to selectively emit the light on the basis of 2-dimensional image information; and in said aerial image forming step, said visible light which was selectively emitted is allowed to enter, is deflected and scanned in the direction perpendicular to a line direction, and is converted into 2-dimensional image, and after that, a plane aerial image is formed.

29. An aerial image inputting/outputting apparatus, comprising:

a visible light generating unit to generate a plurality of 1-dimensional visible lights arranged in a line;

a deflecting unit to deflect and scan the 1-dimensional visible lights across a first plane such that the lights form a 2-dimensional image;

a first lens disposed along the first plane to convert the lights forming the 2-dimensional image into parallel lights;

a second lens parallel to the first lens along an optical axis to converge the parallel lights at a focal point;

a third lens disposed between said first lens and said second lens and reciprocating within a predetermined range with respect to the first lens along an optical axis to thereby change the focal point;

a photodetecting unit having a 1-dimensional photosensitive unit having a plurality of photosensitive elements arranged in the same line as the 1-dimensional lights of said visual image generator; and a controller to control said visual light generating unit to selectively emit the light in accordance with a 3-dimensional image input of a character or a figure synchronously with the deflection scan of said deflecting unit, thereby controlling said aerial image forming unit to form the solid aerial image.

30. An apparatus according to claim 29, wherein said solid aerial image forming unit includes:
   a first lens to convert the 2-dimensional scanning image from said deflecting unit into parallel light;
   a second convex lens disposed a predetermined distance away from said first lens along the optical axis;
   a third lens, disposed between said first and second lenses and movable along the optical axis to form the plane aerial image at a position of a focal distance; and
   an actuator for reciprocatingly moving said third convex lens within a predetermined range in the optical axial direction, thereby changing the position of said plane aerial image.

31. An apparatus according to claim 30, wherein said first and second lenses are Fresnel lenses.

32. An aerial image input/output method comprising the steps of:
   generating a plurality of 1-dimensional visible lights in a line;
   deflecting and scanning the 1-dimensional visible lights across a first plane such that the lights form a 2-dimensional image;
   converting the lights forming the 2-dimensional image into parallel lights;
   converging the parallel lights at a focal point;
   changing the focal point along the optical axis within a predetermined range; and
   selectively emitting the light in accordance with a 3-dimensional image input synchronously with said step of deflecting and scanning, thereby forming a solid aerial image.

* * * * *